United States Patent
Hawes et al.

(10) Patent No.: US 9,936,734 B2
(45) Date of Patent: Apr. 10, 2018

(54) PERSONAL CARRYING CASE FOR ELECTRONIC VAPING DEVICE

(71) Applicant: Altria Client Services LLC, Richmond, VA (US)

(72) Inventors: Eric Hawes, Richmond, VA (US); Terry Bache, Richmond, VA (US)

(73) Assignee: ALTRIA CLIENT SERVICES, LLC., Richmond, VA (US)

( * ) Notice: Subject to any disclaimer, the term of this patent is extended or adjusted under 35 U.S.C. 154(b) by 90 days.

(21) Appl. No.: 15/067,395

(22) Filed: Mar. 11, 2016

(65) Prior Publication Data

US 2017/0258136 A1    Sep. 14, 2017

(51) Int. Cl.
*A24F 47/00* (2006.01)
*G08C 17/02* (2006.01)
(Continued)

(52) U.S. Cl.
CPC ............ *A24F 47/008* (2013.01); *A24F 15/18* (2013.01); *G08C 17/02* (2013.01); *H04W 76/02* (2013.01); *H04W 84/18* (2013.01)

(58) Field of Classification Search
CPC ................................ A24F 47/08; A61M 15/06
See application file for complete search history.

(56) References Cited

U.S. PATENT DOCUMENTS 6,637,430 B1   10/2003   Voges et al.
7,293,565 B2   11/2007   Griffin et al.
(Continued)

FOREIGN PATENT DOCUMENTS

CN   201384062 Y   1/2010
CN   202122096 U   1/2012
(Continued)

OTHER PUBLICATIONS

MaxxVapor Elite Personal Charging Case (PCC). SaveASmoker. com: The World's Most Popular Electronic Cigarettes. (2016). www.saveasmoker.com/MV-Elite-Charging-Case-p/2mve-pcc.htm.
(Continued)

*Primary Examiner* — Nabil Syed
(74) *Attorney, Agent, or Firm* — Harness, Dickey & Pierce, PLC

(57) ABSTRACT

A personal carrying case for holding an e-vaping device includes communication interfaces configured to establish communication links with the e-vaping device and a remotely-located computer device. Control circuitry included in the case may control an element of the e-vaping device according to a control command received from the computer device. The control circuitry may control the e-vaping device element via an e-vaping device communication link, and the control circuitry may receive the control command via a computer device communication link. The computer device communication link may be an ad hoc wireless network communication link. The control circuitry may process information received from the e-vaping device to communicate status information and signals to the computer device. Separate e-vaping device elements may be identified and associated with separate accounts, and e-vaping device usage may be tracked in association with said accounts based on the separate identities of elements used during vaping.

25 Claims, 8 Drawing Sheets

(51) Int. Cl.
*H04W 76/02* (2009.01)
*A24F 15/18* (2006.01)
*H04W 84/18* (2009.01)

(56) References Cited

U.S. PATENT DOCUMENTS

| | | |
|---|---|---|
| 8,156,944 B2 | 4/2012 | Han |
| 8,314,591 B2 | 11/2012 | Terry et al. |
| 8,927,277 B2 | 1/2015 | Yamanaka et al. |
| 9,018,899 B2 | 4/2015 | Xiang |
| 2009/0283103 A1 | 11/2009 | Nielsen et al. |
| 2010/0307518 A1 | 12/2010 | Wang |
| 2012/0227753 A1 | 9/2012 | Newton |
| 2013/0341218 A1 | 12/2013 | Liu |
| 2013/0342157 A1 | 12/2013 | Liu |
| 2014/0014124 A1 | 1/2014 | Glasberg et al. |
| 2014/0096781 A1 | 4/2014 | Sears et al. |
| 2014/0096782 A1 | 4/2014 | Ampolini et al. |
| 2014/0107815 A1 | 4/2014 | LaMothe |
| 2014/0224267 A1 | 8/2014 | Levitz et al. |
| 2014/0246035 A1 | 9/2014 | Minskoff et al. |
| 2015/0075546 A1 | 3/2015 | Kueny, Sr. et al. |
| 2015/0097513 A1 | 4/2015 | Liberti et al. |
| 2015/0100441 A1 | 4/2015 | Alarcon et al. |
| 2015/0102777 A1 | 4/2015 | Cooper |
| 2015/0128971 A1 | 5/2015 | Verleur et al. |
| 2015/0181945 A1* | 7/2015 | Tremblay ............... A24F 47/008 131/328 |
| 2015/0215439 A1 | 7/2015 | Stanimirovic et al. |
| 2015/0224268 A1 | 8/2015 | Henry et al. |
| 2017/0014582 A1* | 1/2017 | Skoda .................. A61M 11/042 |

FOREIGN PATENT DOCUMENTS

| | | |
|---|---|---|
| EP | 2975956 A1 | 1/2016 |
| WO | WO-2015127429 A1 | 8/2015 |
| WO | WO 2015/128666 A1 | 9/2015 |
| WO | WO-2015137815 A1 | 9/2015 |
| WO | WO-2015150760 A1 | 10/2015 |
| WO | WO-2016005601 A1 | 1/2016 |

OTHER PUBLICATIONS

Reynolds American. "Vuse FOB with Bluetooth Technology Offers Innovative, New Vapor Experience". Mar. 2016. http://www.reynoldsamerican.com/About-Us/Press-Releases/Press-Release-Details-/2016/VUSE-FOB-with-Bluetooth-technology-offers-innovative-new-vapor-experience/default.aspx.

Melissa Kress. "RAI gives Sneak Peak of VUSE's Next Generation: Tobacco company unveils four 'truly game-changing innovations' in vapor", Convenience Store News. Nov. 2015. http://www.csnews.com/product-categories/tobacco/rai-reveals-next-gen-vuse-products?nopaging=1.

International Search Report and Written Opinion dated Jun. 14, 2017 issued in corresponding International Application No. PCT/EP2017/055740.

* cited by examiner

PERSONAL CARRYING CASE FOR ELECTRONIC VAPING DEVICE

BACKGROUND

Field

The present disclosure relates in general to an electronic vaping device or e-vaping device configured to generate a dispersion using a formulation, and more particularly to a personal carrying case configured to charge the e-vaping device.

Description of Related Art

E-vaping devices, also referred to herein as electronic vaping devices (EVDs) may be used by adult vapers for portable vaping. Personal carrying cases (PCCs) may provide an enclosure of one or more portions of an e-vaping device and thus provide a mobile storage location for one or more e-vaping devices between vapings. In some cases, a PCC accommodates a disassembled e-vaping device, where a power supply section of the e-vaping device is accommodated in a separate portion of the PCC relative to another section of the e-vaping device. A PCC may enable an adult vaper to store, for example, multiple power supply sections for an e-vaping device, so that the adult vaper may replace a depleted power supply section. In some cases, a PCC enables charging of a power supply section of an e-vaping device, to extend a vaping capability of the e-vaping device.

SUMMARY

According to some example embodiments, a personal carrying case (PCC) for holding an e-vaping device (EVD) includes a first communication interface, a second communication interface, and a control device. The first communication interface may be configured to establish a first communication link with the EVD. The second communication interface may be configured to establish a second communication link with a remotely-located computer device. The control device may be configured to control at least one element of the EVD according to a control command received from the computer device, the control command being received via the second communication link, the control device controlling the at least one element of the EVD via the first communication link.

In some example embodiments, the second communication link may be an ad hoc wireless network communication link. The control device may be configured to command the second communication interface to establish the second communication link based on the first communication interface establishing the first communication link with the EVD.

In some example embodiments, the control device may be configured to control the at least one element to selectively disable the EVD from generating a dispersion.

In some example embodiments, the control device may be configured to control the at least one element to selectively adjust at least one parameter of light emitted by an activation light of the EVD during vaping.

In some example embodiments, the control device may be configured to receive information from at least one element of the EVD via the first communication link, the information being associated with at least one element of the EVD. The control device may be further configured to determine a status associated with the EVD based on the information. The control device may be further configured to communicate the status to the computer device via the second communication link.

In some example embodiments, the EVD may include a cartridge and a power supply section, the cartridge being configured to generate a dispersion based on receiving electrical power, the power supply section including an EVD power supply and control circuitry, the EVD power supply being configured to supply the electrical power to the cartridge, the EVD control circuitry being configured to selectively control the supply of electrical power from the EVD power supply to the cartridge.

In some example embodiments, the information may include cartridge information associated with the cartridge of the EVD.

In some example embodiments, the cartridge information may include at least one of: identification information identifying the cartridge; flavorant information indicating a flavor of formulation, the formulation being held in a reservoir of the cartridge; and formulation reservoir level information indicating an amount of a formulation held in a reservoir of the cartridge.

In some example embodiments, the control device may be configured to associate the cartridge with a cartridge account based on the cartridge information. The control device may be further configured to generate EVD usage history information based on monitoring EVD information received from the EVD over time, the EVD usage history information being associated with usage of the EVD to generate a dispersion during vaping. The control device may be further configured to associate the EVD usage history information with the cartridge account based on correlating cartridge information included in the monitored EVD information with the cartridge associated with the cartridge account.

In some example embodiments, the control device may be configured to receive the cartridge information from a cartridge storage device via the first communication link, the cartridge storage device being included in the cartridge.

In some example embodiments, the information may include EVD power supply information indicating a charge level of the EVD power supply. The control device may be configured to receive the EVD power supply information from the power supply section via the first communication link.

In some example embodiments, the control device may be configured to generate a notification based on the information, the notification indicating that at least one operating parameter of the EVD at least meets an alert threshold value.

According to some example embodiments, a method may include establishing a first communication link with an e-vaping device (EVD) held in a personal carrying case (PCC), establishing a second communication link with a remotely-located computer device, and controlling at least one element of the EVD via the first communication link according to a control command communicated from the computer device to the PCC, the control command being communicated via the second communication link.

In some example embodiments, the second communication link may be an ad hoc wireless network communication link.

In some example embodiments, controlling the at least one element may include at least one of, selectively disabling the EVD from generating a dispersion, selectively adjusting at least one parameter of light emitted by an activation light of the EVD during vaping, and selectively disabling the activation light of the EVD.

In some example embodiments, the method may further include receiving information from at least one element of the EVD via the first communication link, the information being associated with at least one element of the EVD, determining a status associated with the EVD based on the information, and communicating the status to the computer device via the second communication link.

According to some example embodiments, a non-transitory computer readable medium may store program code. The program code, when executed by a computer processing device, may cause the computer processing device to establish a first communication link with an e-vaping device (EVD) held in a personal carrying case (PCC), establish a second communication link with a remotely-located computer device, and control at least one element of the EVD via the first communication link according to a control command communicated from the computer device to the PCC, the control command being communicated via the second communication link.

In some example embodiments, the second communication link may be an ad hoc wireless network communication link.

In some example embodiments, controlling the at least one element may include at least one of selectively disabling the EVD from generating a dispersion, selectively adjusting at least one parameter of light emitted by an activation light of the EVD during vaping, and selectively disabling the activation light of the EVD.

In some example embodiments, the program code, when executed by a computer processing device, may further cause the computer processing device to receive information from at least one element of the EVD via the first communication link, the information being associated with at least one element of the EVD, determine a status associated with the EVD based on the EVD information, and communicate the status to the computer device via the second communication link.

According to some example embodiments, a method may include establishing a communication link with a control device of a remotely-located personal carrying case (PCC), receiving EVD status information associated with at least one element of the coupled EVD via the communication link, and displaying a graphical representation of the EVD status information. The PCC may be coupled with an e-vaping device (EVD).

In some example embodiments, the EVD status information may include information indicating a proportion of formulation held in a reservoir of the EVD, the proportion of formulation indicating an amount of the formulation held in the reservoir relative to an amount of the formulation held in a completely filled reservoir of the EVD. The graphical representation of the EVD status information may include a graphical representation of the reservoir and a graphical representation of the proportion of formulation held in the reservoir.

In some example embodiments, the EVD status information may include information indicating a charge level of an EVD power supply of the EVD. The graphical representation of the EVD status information may include a graphical representation of the EVD power supply and a graphical representation of the charge level of the EVD power supply.

In some example embodiments, the EVD status information may include information indicating a remaining quantity of individual vapings that may be provided by the EVD with present resources within the EVD. The graphical representation of the EVD status information may include a graphical representation of the remaining quantity of individual vapings that may be provided by the EVD.

According to some example embodiments, a method includes establishing a communication link with a control device of a remotely-located personal carrying case (PCC), displaying a control setting display interface indicating at least one control setting according to which the control device of the PCC may control one or more elements of the coupled EVD, receiving an adult vaper specification of an adjustment to the at least one control setting to establish an adjusted control setting, based on adult vaper interaction with the at least one interactive icon, and communicating one or more control commands to the control device of the PCC to command the control device to control one or more elements of the coupled EVD according to the adjusted control setting. The PCC may be coupled with an e-vaping device (EVD). The display interface may include at least one interactive icon associated with the at least one control setting, the at least one interactive icon including a graphical representation of the at least one control setting.

In some example embodiments, the at least one interactive icon may include a sliding scale icon.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
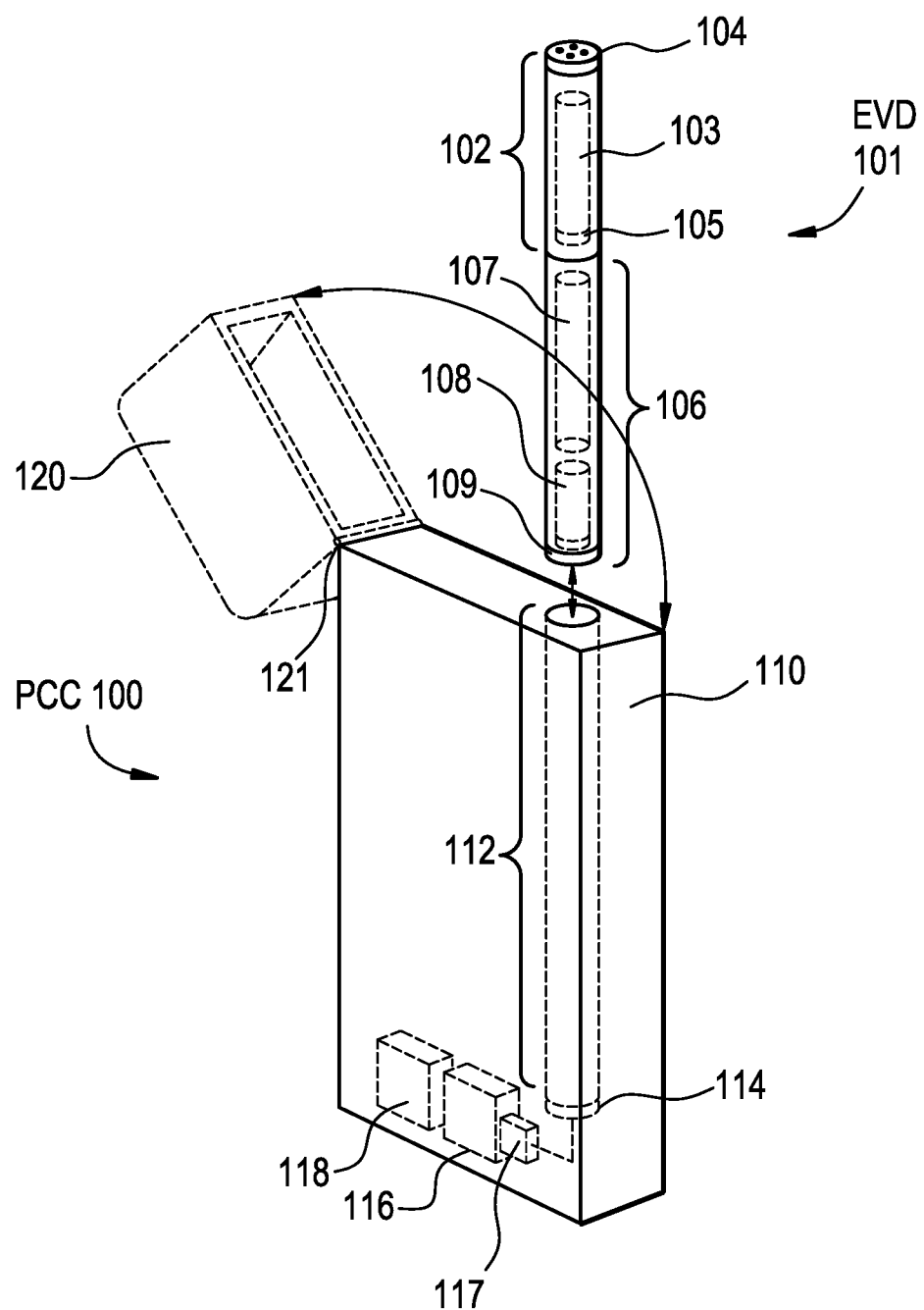
FIG. 1 is a perspective view of a personal carrying case (PCC) for an e-vaping device (EVD) according to some example embodiments.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF EXAMPLE EMBODIMENTS

One or more example embodiments will be described in detail with reference to the accompanying drawings.

Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, elements, regions, layers, and/or sections, these elements, elements, regions, layers, and/or sections, should not be limited by these terms. These terms are only used to distinguish one element, element, region, layer, or section, from another region, layer, or section. Thus, a first element, element, region, layer, or section, discussed below may be termed a second element, element, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or elements, but do not preclude the presence or addition of one or more other features, integers, steps, operations, elements, elements, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. In some example embodiments, a hardware device may be implemented using an application-specific integrated chip (ASIC).

Software may include a computer program, program code, instructions, or some combination thereof, for independently or collectively instructing or configuring a hardware device to operate as desired. The computer program and/or program code may include program or computer-readable instructions, software elements, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, element, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data electronic storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or elements such as the described system, architecture, devices, circuit, and the like, may be connected or combined to be different from the above-described methods, or results may be appropriately achieved by other elements or equivalents.

FIG. 1 is a perspective view of a personal carrying case (PCC) for an e-vaping device (EVD) according to some example embodiments. As described herein, an e-vaping device may include one or more of the features set forth in U.S. Patent Application Publication No. 2013/0192623 to Tucker et al. filed Jan. 31, 2013 and U.S. Patent Application Publication No. 2013/0192619 to Tucker et al. filed Jan. 14, 2013, the entire contents of each of which are incorporated herein by reference thereto. As used herein, the term "e-vaping device" is inclusive of all types of electronic vaping devices, regardless of form, size or shape.

The PCC 100 includes a body element 110, also referred to herein as a PCC "body". The body 110 includes an e-vaping device slot 112. The slot 112 extends into an interior of the body 110. The slot 112 is configured to receive at least a portion of an assembled EVD 101.

In some example embodiments, the PCC 100 includes a cover element 120, also referred to herein as a PCC "cover". In some example embodiments, the cover 120 is configured to be coupled to the body 110, such that the cover 120 and the body 110 collectively establish an enclosure in which an assembled EVD 101 may be accommodated. As shown in FIG. 1, the cover 120 may be coupled to the body 110 via a hinge mechanism 121.

As shown in FIG. 1, an assembled EVD 101 may be inserted into the slot 112. The EVD 101 is inserted along a longitudinal axis of the slot 112 and the EVD 101. The EVD 101 includes a cartridge (or first section) 102 and a power supply section (or second section) 106. The cartridge 102 may be replaceable and may be removably connected or disconnected from the power supply section 106 via an interface (not shown in FIG. 1).

The power supply section 106 includes at least one power supply 107 and an e-vaping device electrical connection 109 at a tip end of the e-vaping device 101. The power supply section 106 may also include one or more light indicators, including one or more LEDs, at the tip end. The at least one power supply 107 will now be referred to herein as the EVD power supply 107, but it will be understood that the at least one power supply 107 encompasses multiple power supplies, including one or more rechargeable batteries. The e-vaping device electrical connection 109 will now be referred to herein as the interface 109, but it will be understood that the e-vaping device electrical connection 109 encompasses multiple interfaces, including one or more communication interfaces and electrical interfaces.

The cartridge 102 includes at least one dispersion generator 103 configured to generate a dispersion. The dispersion generator 103 may generate a dispersion based on a supply of electrical power from the power supply section 106.

The dispersion generator 103 may be configured to generate a dispersion based on vaporizing a pre-vapor formulation to generate a vapor. The dispersion generator 103 may include a pre-vapor formulation reservoir that holds one or more pre-vapor formulations. One or more of pre-vapor formulations may include those described in U.S. Patent Application Publication No. 2015/0020823 to Lipowicz et al. filed Jul. 16, 2014 and U.S. Patent Application Publication No. 2015/0313275 to Anderson et al. filed Jan. 21, 2015, the entire contents of each of which is incorporated herein by reference thereto. The dispersion generator 103 may include a heater configured to heat at least a portion of the pre-vapor formulation to vaporize the pre-vapor formulation and to generate the vapor. The dispersion generator 103 may include a dispensing interface configured to draw pre-vapor formulation from a pre-vapor formulation reservoir. The dispensing interface may be in fluid communication with the heater, such that the dispensing interface draws pre-vapor formulation into fluid communication with the heater and the heater vaporizes the pre-vapor formulation drawn through the dispensing interface. In some example embodiments, the heater is coupled to the dispensing interface. The dispensing interface may include a wick. The heater may be configured to be electrically coupled to the power supply section 106 via an interface (not shown in FIG. 1) between the cartridge 102 and the power supply section 106. For example, the dispersion generator 103 may be a vaporizer that includes a heater coupled to a dispensing interface, where the dispensing interface draws a pre-vapor formulation from a reservoir. The heater may apply heat to the dispensing interface to vaporize the pre-vapor formulation drawn from the reservoir, thereby forming a vapor.

The dispersion generator 103 may be an atomizer configured to generate a dispersion based on applying mechanical force to a pre-dispersion formulation. For example, the dispersion generator 103 may be an atomizer that includes one or more of a fluid sprayer assembly, a valve assembly, a pump assembly, some combination thereof, etc.

The cartridge 102 may include an outlet end insert 104 at an outlet end of the EVD 101. The outlet end insert 104 may include one or more outlet ports via which a dispersion may be drawn during vaping.

During vaping, an EVD power supply 107 in the power supply section 106 may supply power to an element of a dispersion generator 103 in the cartridge 102. The element may generate a dispersion based on the supplied power. As a result, the EVD power supply 107 may support dispersion generation by a dispersion generator 103. The dispersion may be drawn through the outlet end insert 104. The element may include one or more of a heater of a vaporizer, a mechanical element of an atomizer, or some combination thereof.

In some example embodiments, an e-vaping device 101 includes one or more instances of control circuitry. Control circuitry may include one or more of processing circuitry and storage devices. Control circuitry may control dispersion generation by an e-vaping device. In the example embodiment shown in FIG. 1, power supply section 106 includes control circuitry 108.

The control circuitry 108 may include processing circuitry including, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. In some example embodiments, the control circuitry 108 may be at least one of an application-specific integrated circuit (ASIC) and an ASIC chip.

The control circuitry 108 may be configured as a special purpose machine by executing computer-readable program code stored on an electronic storage device. The program code may include program or computer-readable instructions, software elements, software modules, data files, data structures, and/or the like, capable of being implemented by one or more hardware devices, such as one or more of the control circuitry mentioned above. Examples of program code include both machine code produced by a compiler and higher level program code that is executed using an interpreter.

The control circuitry 108 may be configured to control a supply of electrical power from the power supply 107 to the dispersion generator 103 in the cartridge 102. In some example embodiments, the control circuitry 108 is configured to selectively supply electrical power to the dispersion generator 103 based on one or more command signals, executing one or more instances of program code stored at the EVD 101, and some combination thereof.

As shown in FIG. 1, cartridge 102 includes an electronic storage device 105. The electronic storage device 105 may store information associated with the cartridge 102. Identification information may include information that uniquely identifies the cartridge, a formulation included in the cartridge, or some combination thereof. Identification information may include one or more unique identifiers associated with the cartridge 102. The unique identifiers may include a flavorant identifier that identifies a flavor and/or flavorant associated with the formulation held in the cartridge 102. A unique identifier may identify one or more of a manufacturer of the cartridge 102, a make and model of the cartridge 102, some combination thereof, or the like. The unique identifiers may include one or more of a Stock Keeping Unit ("SKU"), Universal Product Code ("UPC"), International Article Number ("EAN"), Global Trade Item Number ("GTIN"), Australian Product Number ("APN"), or the like.

The electronic storage device 105 may be configured to be communicatively coupled to interface 109 via the power supply section 106. In some example embodiments, power supply section 106 includes an electronic storage device (not shown in FIG. 1), where the electronic storage device may store information associated with cartridge 102. An electronic storage device in the power supply section 106 may store information accessed from an electronic storage device 105 in the cartridge 102. In some example embodiments, the control circuitry 108 is configured to access the electronic storage device 105 and identification information stored thereon.

As shown in FIG. 1, the PCC body 110 may include an interface 114 in the slot 112. The PCC 100 may be configured to couple with the EVD 101, via coupling of the interfaces 114, 109, when the EVD 101 is inserted in the slot 112. The coupling may include one or more of physically coupling, electrically coupling, and communicatively coupling. For example, the interface 114 may include an electrical connector configured to establish an electrical connection between the PCC 100 and the EVD 101 via contacting an electrical connector included in the EVD interface 109. The interface 114 may be configured to communicate data between the EVD 101 and the PCC 100, thereby establishing a communication link between one or more portions of the PCC 100 and one or more portions of the EVD 101.

In some example embodiments, the PCC 100 may include an electrical charging circuit (ECC) 116. The ECC 116 may be configured to be electrically coupled to interface 114. The ECC 116 may include a battery 117. The battery 117 is referred to herein as a PCC battery 117.

The ECC 116 may be configured to selectively supply electrical power to an EVD 101 based on the EVD 101 being electrically coupled to the ECC 116 via interfaces 114, 109. In some example embodiments, the PCC 100 may be configured to charge an EVD power supply 107 of an EVD 101 electrically coupled to the ECC 116. The PCC 100 may therefore enable the EVD 101 to support additional vapings by an e-vaping device, thereby improving the sensory experience provided by the e-vaping device.

The PCC 100 may include a control device 118 electrically coupled to one or more of the ECC 116 and the interface 114. It will be understood that the control device 118 is a computer processing device. The control device includes at least one of processing circuitry and at least one electronic storage device.

The control device 118 may include processing circuitry including, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. In some example embodiments, the control device 118 may be an application-specific integrated chip (ASIC).

The control device 118 may be configured as a special purpose machine by executing computer-readable program code stored on an electronic storage device. The program code may include program or computer-readable instructions, software elements, software modules, data files, data structures, and/or the like, capable of being implemented by one or more hardware devices, such as one or more of the control circuitry mentioned above. Examples of program code include both machine code produced by a compiler and higher level program code that is executed using an interpreter.

In some example embodiments, the control device 118 may include a transceiver, also referred to herein as a transceiver interface. The transceiver interface may be configured to communicate with one or more devices via establishing a communication link with said devices. The one or more devices may include one or more computer processing devices, including one or more mobile computer devices, smartphones, etc. The transceiver interface may include any known wireless communication interface, including an ad hoc network communication interface.

In some example embodiments, one or more of the ECC 116 or the control device 118 are absent from the PCC 100. For example, the ECC 116 may be absent from PCC 100, and the control device 118 may be configured to be communicatively coupled with the EVD 101 via interface 114.

As shown in FIG. 1, the interface 114 may be located at a base of the slot 112. However, it will be understood that the interface 114 may be located at various locations in the slot 112, including one or more portions of the sidewalls of the slot 112.

The control device 118 may be configured to communicate with one or more portions of the EVD 101 via a communication link between the control device 118 and the one or more portions of the EVD 101. The communication link may be established by an interface in the PCC 100. Such an interface may be the interface 114. In some example embodiments, such an interface is a transceiver interface included in the PCC 100. In some example embodiments, such an interface is included in the control device 118.

The control device 118 may be configured to receive information from the EVD 101 via an established communication link with the EVD 101. For example, the control device 118 may be configured to receive information associated with the power supply section 106, including information indicating a status of the EVD power supply 107. Such information, also referred to herein as EVD power supply information, may include information indicating an amount of electrical power stored in the EVD power supply 107 (e.g., a "charge level" of the EVD power supply 107).

In another example, the control device 118 may be configured to receive information associated with the cartridge 102, including one or more of an amount of pre-dispersion formulation (also referred to herein as "formulation") held in a formulation reservoir of the dispersion generator 103 (e.g., a "reservoir level"). Information associated with the cartridge 102, also referred to herein as cartridge information, may include identification information identifying the cartridge 102, flavorant information associated with the cartridge, some combination thereof, etc. The control device 118 may receive cartridge information through communicating with one or more of the control circuitry 108 or the electronic storage device 105.

In some example embodiments, the control device 118 is configured to generate command signals and communicate said command signals to one or more elements of the EVD 101. The command signals, when received at the EVD 101, may be executed by one or more elements of the EVD 101 to control at least one element of the EVD 101. The command signals may be executed by the control circuitry 108. The command signals may be communicated from the control device 118 to the EVD 101 via an established communication link with the EVD 101. In some example embodiments, the control device 118 is configured to control one or more elements of EVD 101 independently of control circuitry 108.

Figure 2:
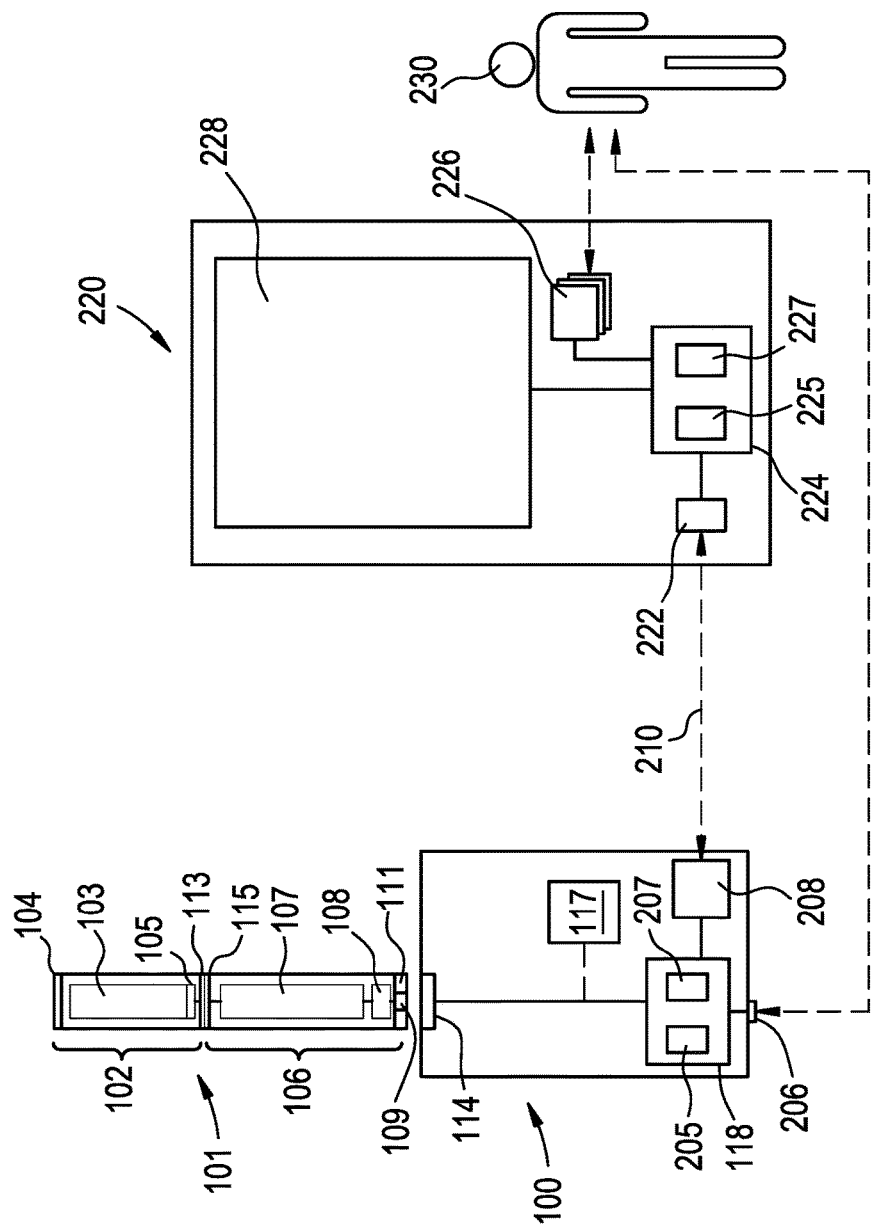
FIG. 2 is a schematic illustrating a PCC communicatively coupled to both an EVD and a remotely-located computer device, according to some example embodiments.

FIG. 2 is a schematic illustrating a PCC communicatively coupled to both an EVD and a remotely-located computer device, according to some example embodiments.

As shown in FIG. 2, a PCC 100 includes an interface 114, a control device 118, an interface 206, and a transceiver 208. When the PCC 100 is included in the PCC 100 shown in FIG. 1, the interface 114 may be included in the interface 114 shown in FIG. 1. When the PCC 100 is included in the PCC 100 shown in FIG. 1, the control device 118 may be included in the control device 118 shown in FIG. 1.

The control device 118 includes at least one instance of processing circuitry 205 and at least one electronic storage device 207. In some example embodiments, one or more elements 114, 208, 206 of PCC 100 are included in the control device 118. For example, transceiver 208 may be included within the control device 118. In some example embodiments, the PCC 100 includes an ECC (not shown in FIG. 2). An ECC may be included in the control device 118. In some example embodiments, the control device 118 is included in an ECC 116.

As shown in the illustrated embodiment of FIG. 2, the PCC 100 is configured to establish a communication link between the control device 118 and the EVD 101 via interface 114. PCC 100 may be configured to connect with EVD 101 via respective interfaces 114, 109 of the PCC 100 and EVD 101. As shown in the illustrated embodiment of FIG. 2, the EVD 101 may include at least one activation light 111 at a tip end of the EVD 101, where the activation light 111 and interface 109 are both located at the tip end. As also shown, the EVD 101 may include separate cartridge 102 and power supply sections 106. The cartridge 102 includes an interface 113 and the power supply section 106 includes an interface 115. The cartridge 102 and power supply section 106 may be configured to be coupled via interfaces 113, 115.

In some example embodiments, the EVD 101 is configured to communicatively couple one or more portions of the respective cartridge 102 and power supply section 106 via coupling interfaces 113, 115. For example, where the cartridge 102 includes an electronic storage device 105 configured to store information associated with the cartridge 102, the EVD 101 may be configured to communicatively couple the electronic storage device 105 to the interface 109 of the power supply section 106, such that the control device 118 may be communicatively coupled to the electronic storage device 105 via a communication link established between the control device 118 and the EVD 101 via interface 114. In some example embodiments, the EVD 101 is configured to communicatively couple the electronic storage device 105 to the control circuitry 108 of the power supply section 106, such that the control circuitry 108 may access information stored at the electronic storage device 105.

Computer device 220 includes a control device 224, a transceiver interface 222, a display 228, and one or more interfaces 226. The control device 224 may include one or more of an instance of processing circuitry 225 and an electronic storage device 227. The display 228 may be configured to display one or more graphical interfaces to the adult vaper 230, where the one or more graphical interfaces are associated with one or more of the PCC 100 or the EVD 101. The display 228 may be a touchscreen display interface.

The computer device 220 may be a remotely-located computer device 220, relative to the PCC 100. For example, the computer device 220 may be one or more of a smartphone, tablet computer, desktop computer, laptop computer, electronic accessory device, electronic peripheral device, etc. As shown, the transceiver 208 may be configured to establish a communication link 210 between the PCC 100 and the computer device 220. In some example embodiments, the transceiver 208 is a wireless network communication interface, such that the communication link 210 is a wireless network communication link. In some example embodiments, the transceiver 208 is an ad hoc wireless network communication interface, such that the communication link 210 is an ad hoc wireless network communication link.

In some example embodiments, control device 118 is configured to control the transceiver 208 to control the establishing and disbanding of the communication link 210. In some example embodiments, control device 118 commands transceiver 208 to establish a communication link 210 with a selected computer device 220. The control device 118 may command the transceiver 208 to establish the communication link 210 with a selected computer device 220 based on a command received at the control device 118 from an interface 206. The control device 118 may command the transceiver 208 to establish the communication link 210 with a selected computer device 220 based on the interface 114 establishing a communication link between the control device 118 and one or more portions of the EVD 101.

In some example embodiments, the control device 118 is configured to control one or more elements of the EVD 101 based on a control command received from the computer device 220 via communication link 210. The one or more elements of the EVD 101 may include one or more of any elements included in one or more of the cartridge 102 or the power supply section 106. For example, the control device 118 may control one or more of the control circuitry 108, EVD power supply 107, dispersion generator 103, etc.

Controlling one or more elements of the EVD 101 may include selectively enabling or disabling one or more elements of the EVD 101. For example, the control device 118 may command the control circuitry 108 to inhibit the supply of electrical power from the EVD power supply 107 to the dispersion generator 103, even in response to receipt of a vaping command signal at the control circuitry 108, such that the control device 118 "locks out" the EVD 101 from generating any dispersion. In another example, the control device 118 may control an electrical switch in the EVD 101 to electrically decouple the dispersion generator 103 from the EVD power supply 107. Thus, the control device 118 may selectively enable or disable vaping by the EVD 101 based on control commands received from the computer device 220 via the communication link 210.

In another example, the control device 118 may command the control circuitry 108 to adjust one or more operating parameters associated with the activation light 111. Control circuitry 108 may control the activation light 111 according to the one or more operating parameters during vaping. Such operating parameters may include one or more of a brightness of emitted light, a color temperature of emitted light, an activation sequence of emitted light, whether the activation light 111 is enabled or disabled from emitting light during vaping, and some combinations thereof.

Interfaces 206, 226 may each include one or more interfaces via which an adult vaper 230 may interact with one or more portions of the PCC 100 or computer device 220, respectively. An interface 206, 226 may include a tactile interface, a button, a touchscreen interface, some combination thereof, or the like. In some example embodiments, an adult vaper 230 may interact with the interface 206, 226 to provide commands to one or more of the control devices 118, 224. For example, the control device 118 may command transceiver 208 to establish a communication link 210 with the computer device 220 based on adult vaper 230 interacting with one or more interfaces 206, 226.

In some embodiments, an adult vaper 230 may interact with an interface 226 to command the control device 224 to generate a control command and communicate the control command to the PCC control device 118 via communication link 210. The control command may command the control device 118 to execute a particular control of the EVD 101. The particular control may be specified by the adult vaper 230 via interaction with an interface 226. The control device 118 may control one or more elements of the EVD 101 based on the control command to implement the specified particular control of the EVD 101. In some example embodiments, the control device 118 generates one or more control signals and communicates the control signals to the control circuitry 108 to implement the specified particular control of the EVD 101. The one or more control signals, when executed by the control circuitry 108, may cause the control circuitry 108 to execute the specified particular control of the EVD 101 via controlling one or more particular elements of the EVD 101. In some example embodiments, the control device 118 directly controls one or more elements via the established communication link between the control device 118 and the EVD 101, independently of the control circuitry 108.

In some example embodiments, the control device 118 communicates information associated with one or more of the PCC 100 or the EVD 101 to the computer device 220 via communication link 210. The information may be provided to the adult vaper 230 via the display 228 of the computer device 220. In some example embodiments, the information includes status information, where the status information indicates a status of one or more portions of the PCC 100 or the EVD 101. For example, the status information may indicate one or more statuses of the EVD ("EVD statuses"), where an EVD status includes one or more of a charge level of the EVD power supply 107, a reservoir level of the dispersion generator 103, a lockout status indicating whether the EVD 101 is "locked out," a charging status indicating whether the EVD power supply 107 is being charged, an activation light status indicating the operating parameters according to which the activation light is controlled during vaping, or some combination thereof. In another example, the status information may indicate one or more statuses of the PCC ("PCC statuses"), where a PCC status includes one or more of a charge level of a PCC battery 117 included in the PCC 100. EVD status information may include information indicating a status of the cartridge 102, information indicating a status of the power supply section 106, etc. Cartridge status information may include information indicating a reservoir level associated with the dispersion generator 103, a quantity of vapings remaining, etc. EVD power supply status information may include information indicating a charge level of the EVD power supply 107, a quantity of recharges remaining, etc.

In some example embodiments, the information associated with the EVD 101 includes historical usage history information associated with one or more cartridges 102 of the EVD 101, the EVD 101 in general, or some combination thereof.

Control device 118 may access information associated with one or more portions of the EVD 101, where the information is accessed from one or more of electronic storage device 105 and control circuitry 108. The information may include identification information. The control device 118 may process the information to determine a status of one or more of the cartridge 102, power supply section 106, or EVD 101 in general. The control device 118 may process the information to identify one or more of the cartridge 102, power supply section 106, EVD 101 in general, etc.

The control device 118 may associate one or more of the determined cartridge statuses, identification information, etc. with a cartridge account, such that the control device 118 may track the one or more EVD statuses associated with a given EVD 101, cartridge 102, power supply section 106, etc. over time. Based on such tracking, the control device 118 may generate usage history information, including information indicating a quantity of vapings over time using the given EVD 101 or cartridge 102, a rate of such vapings over time, a rate at which one or more of dispersion generator 103 reservoir level or EVD power supply 107 charge level is depleted over time, a projected time at which one or more of dispersion generator 103 reservoir level or EVD power supply 107 charge level is projected to be depleted below a threshold level based on the determined depletion rate, some combination thereof, etc.

The control device 118 may communicate one or more instances of information to the computer device 220 via the communication link 210. The information may be communicated based on the link being established 210, the control device 118 receiving an information request signal from the computer device 220 via the communication link 210, some combination thereof, or the like.

In some example embodiments, the control device 118 may communicate one or more notifications to the computer device 220 based on a determination that one or more cartridge statuses, EVD power supply statuses, EVD statuses, PCC statuses, etc. at least meets a threshold value associated with the one or more notifications. Such notifications may include a message indicating a particular status and further indicating that the particular status is no greater than a particular threshold.

The notifications may include a prompt to replace the cartridge 102, recharge the EVD power supply 107, recharge a PCC battery 117 of the PCC 100, etc. The notifications may be communicated to the computer device 220 and displayed on the display 228 independently of the control device 118 receiving a request for such notifications from the computer device 220. The notifications may be referred to as "push notifications," because the notifications are "pushed" from the control device 118 to the computer device 220 independently of a request for such notifications being received at the control device 118 from the computer device 220.

Figure 3:
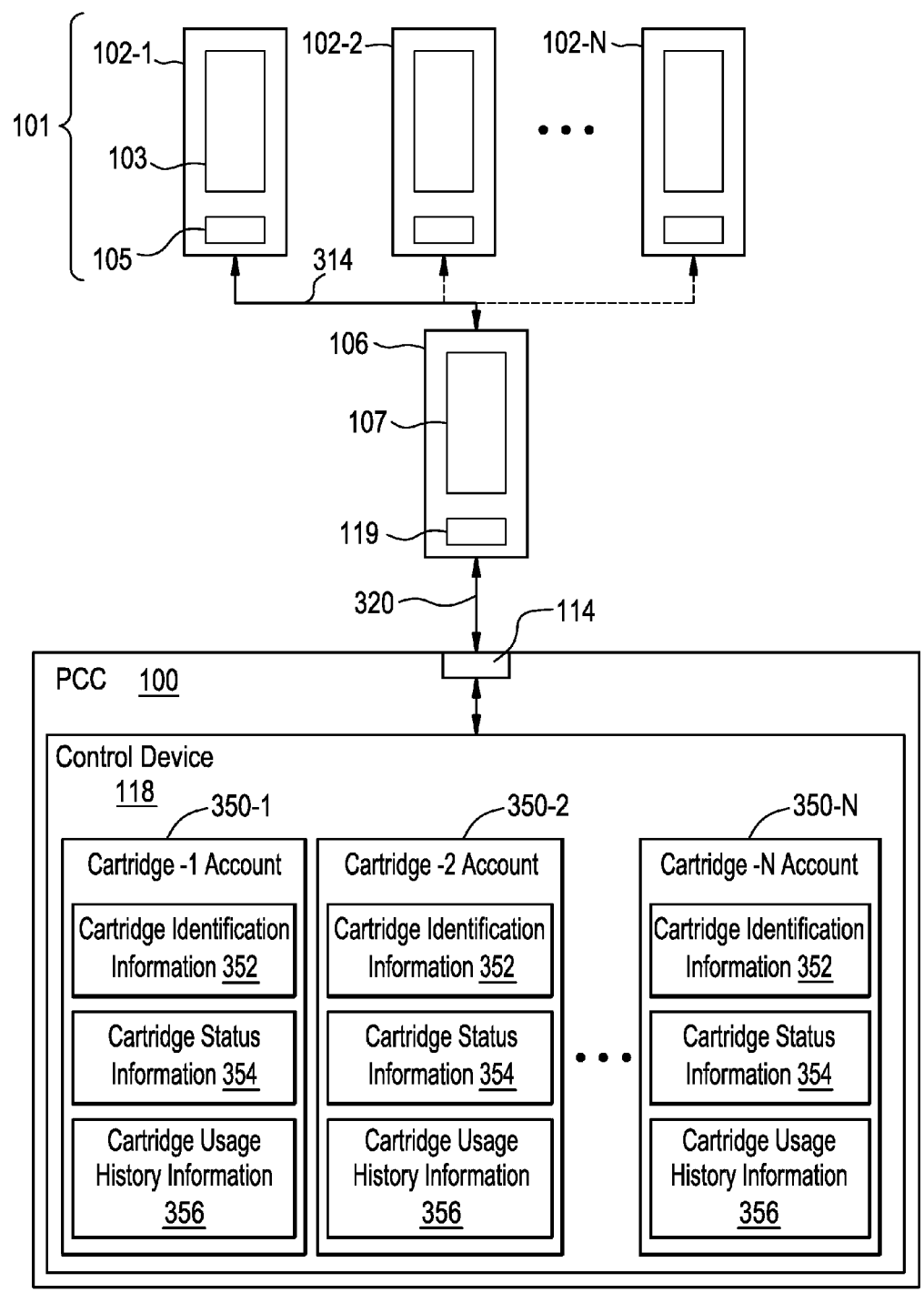
FIG. 3 is a schematic block diagram illustrating a PCC control device managing accounts associated with multiple separate cartridges, according to some example embodiments.

FIG. 3 is a schematic block diagram illustrating the PCC control device 118 of FIG. 2 managing accounts associated with multiple separate cartridges, according to some example embodiments.

As shown, an EVD 101 may be communicatively coupled to a control device 118 in a PCC 100 via an interface 114, such that a communication link 320 is established between the control device 118 and one or more portions of the EVD 101.

As further shown, an EVD 101 may include a power supply section 106 and a cartridge 102, where the cartridge 102 is one of a plurality of various cartridges 102-1 to 102-N. As used herein, "N" is a positive integer having a value of at least one (1). Different cartridges 102-1 to 102-N may be coupled 314 to the power supply section 106 at different times. Thus, the EVD 101 may include different cartridges 102-1 to 102-N at different times. When the control device 118 is communicatively coupled to an EVD 101 via link 320, the control device 118 may be communicatively coupled to the cartridge 102 that is coupled to the power supply section 106 at that time. Thus, the control device 118 may be communicatively coupled with different cartridges 102-1 to 102-N at different times when the communication link 320 is established, based on which cartridge 102 is coupled to the power supply section 106 when a link 320 is established.

As shown in FIG. 3, each cartridge 102-1 to 102-N may include a dispersion generator 103 and an electronic storage device 105. Dispersion generators 103, as described herein, may include different types of dispersion generators configured to generate different types of dispersions. For example, a dispersion generator 103 may be a vaporizer or an atomizer. A vaporizer may generate a dispersion that is a vapor. A vaporizer may generate the vapor via heating a pre-vapor formulation to vaporize at least a portion of the pre-vapor formulation. An atomizer may generate a dispersion via applying a mechanical force to a pre-dispersion formulation. An atomizer may include one or more mechanical elements configured to apply the mechanical force. For example, an atomizer may include a pressurized tank holding a pre-dispersion formulation, and the atomizer may further include a mechanical element that includes one or more of a valve, pump, sprayer, some combination thereof, or the like. One or more portions of the atomizer, including the mechanical element, may exert a mechanical force on the pre-dispersion formulation to generate a dispersion. For example, an atomizer may be configured to generate a dispersion via one or more of releasing a pressurized pre-dispersion formulation into a lower-pressure environment, spraying pre-dispersion formulation particles, evaporating volatile pre-dispersion formulations into an environment, some combination thereof, etc.

Each electronic storage device 105 included in a given cartridge 102 may be configured to store information associated with the respective cartridge 102 in which the electronic storage device 105 is included. Such information may include information associated with one or more dispersion generators 103 included in the respective cartridge 102. The control device 118 may be configured to access the information from an electronic storage device 105 of a cartridge 102 to which the control device 118 is communicatively coupled via communication link 320.

The information stored at a given electronic storage device 105 may include identification information associated with the cartridge 102 in which the electronic storage device 105 is included. Identification information may include information that uniquely identifies the given cartridge 102, a formulation included in a dispersion generator 103 of the cartridge 102, or some combination thereof. Identification information may include one or more unique identifiers associated with the given cartridge 102. The unique identifiers may include a flavorant identifier that identifies a flavor and/or flavorant associated with the formulation held in a dispersion generator 103 of the given cartridge 102. A unique identifier may identify one or more of a manufacturer of the given cartridge 102, a make and model of the given cartridge 102, some combination thereof, or the like. The unique identifiers may include one or more of a Stock Keeping Unit ("SKU"), Universal Product Code ("UPC"), International Article Number ("EAN"), Global Trade Item Number ("GTIN"), Australian Product Number ("APN"), or the like.

Information associated with a given cartridge 102 and stored in the electronic storage device 105 of the given cartridge 102 may include information indicating one or more of an amount of formulation held in a reservoir of the dispersion generator 103 of the given cartridge 102 ("reservoir level"). Information associated with a given cartridge 102 may also be referred to herein as cartridge information associated with the given cartridge 102.

In some example embodiments, power supply section 106 includes an EVD power supply 107 and an electronic storage device 119. The electronic storage device 119 may include information accessed from the electronic storage device 105 of the cartridge 102 coupled to the power supply section 106. The accessed information may include at least some of the information stored at the electronic storage device 105.

The control device 118 is configured to generate and manage cartridge accounts 350-1 to 350-N associated with respective cartridges 102-1 to 102-N. Each cartridge account 350 of accounts 350-1 to 350-N is associated with a separate cartridge 102 of cartridges 102-1 to 102-N. It will be understood that a given cartridge to which a given cartridge account 350 is associated will be referred to herein as an "associated cartridge" with regard to the given cartridge account 350.

Each cartridge account 350 includes information associated with the associated cartridge 102. Such information may include at least one of identification information 352 associated with the associated cartridge 102, cartridge status information 354 associated with the given cartridge 102, and cartridge usage history information 356 associated with the associated cartridge 102. The control device 118 may be configured to generate and manage the accounts 350-1 to 350-N over time based on information accessed from the respective cartridges 102-1 to 102-N over time. The control device 118 may access such information based on communicating with one or more of an electronic storage device 105 and an electronic storage device 119 via link 320. To generate and manage the accounts 350-1 to 350-N, the control device 118 may be configured to store, update, etc. one or more of the information 352, 354, 356 associated with the various accounts 350-1 to 350-N.

As shown in FIG. 3, a given cartridge account 350 includes cartridge identification information 352. Where the control device is linked 320 with a given cartridge 102 of cartridges 102-1 to 102-N, the control device 118 may determine that the given cartridge 102 is associated with a given cartridge account 350 of the cartridge accounts 350-1 to 350-N based on comparing identification information accessed from an electronic storage device 105 of the given cartridge 102 with identification information 352 included in the various cartridge accounts 350-1 to 350-N. When the identification information accessed from the electronic storage device 105 corresponds to identification information 352 of at least one of the cartridge accounts 350, the control device 118 may update at least some information 352, 354, 356 associated with the at least one cartridge account 350 based on at least the information accessed from the electronic storage device 105 of the given cartridge 102. Such updating may include determining new cartridge status information 354, usage history information 356, etc. based on information accessed from at least the electronic storage device 105 of the associated cartridge 102.

As shown, each account 350 includes cartridge status information 354 indicating one or more statuses of the associated cartridge 102 and usage history information 356 indicating usage of the associated cartridge 102 over time. The cartridge status information 354 may include information indicating a reservoir level of one or more dispersion generators 103 of the associated cartridge 102, for example. The control device 118 may update cartridge status information 354 over time based on information accessed from an electronic storage device 105 of the associated cartridge 102.

In some example embodiments, the control device 118 updates cartridge status information 354 of the account 350 based on information accessed from various sources, including sources separate from the electronic storage device 105 of the given associated cartridge 102. For example, where a given cartridge 102 associated with a given account 350 is coupled to an EVD power supply section 106 when the cartridge 102 is linked to the control device 118, the control device 118 may update the status information 354 indicating a reservoir level of the given cartridge 102 based on tracking a charge level of the EVD power supply 107 over time. The control device 118 may correlate depletion of a charge level of the EVD power supply 107 over time with corresponding depletion of the reservoir level of the given cartridge 102 over time. In some example embodiments, the control device 118 may update the status information 354 based on information accessed from electronic storage device 119.

Similarly, the control device 118 may update the usage history information 356 of an account 350 associated with a given cartridge 102 based on information accessed from various sources, including sources separate from the electronic storage device 105 of the given cartridge 102. For example, where an associated cartridge 102 of a given account 350 is coupled to an EVD power supply section 106 when the cartridge 102 is linked to the control device 118, the control device 118 may update usage history information 356 tracking individual vapings over time based on tracking a charge level of the EVD power supply 107 over time. Usage history information indicating an occurrence of an individual vaping may be generated based on detection of the individual vaping. An individual vaping may be detected based on a triggering of a sensor included in the EVD 101. The sensor may generate a signal based on being triggered. One or more electronic storage devices 105, 119 may store information indicating an occurrence of a vaping based on detecting the generated signal and associating a time at which the signal was generated with an occurrence of a vaping at that time. The control device 118 may correlate discrete amounts of charge level depletion of a charge level of the EVD power supply 107 over time with corresponding individual vapings of the given cartridge 102 over time.

In some example embodiments, usage history information 356 associated with a given cartridge 102-1 to 102-N is generated at an electronic storage device 105 of the given cartridge 102-1 to 102-N. In some example embodiments, usage history information 356 associated with a given cartridge 102-1 to 102-N is generated at an electronic storage device 119 of the power supply section 106 to which the given cartridge 102-1 to 102-N is coupled 314. Usage history information 356 may be generated based on successive vapings over time. Usage history information 356 associated with a given cartridge 102-1 to 102-N may include information indicating a distribution of individual vapings using the given cartridge 102-1 to 102-N over time. A distribution of vapings may indicate time periods at which individual vapings using a given cartridge 102-1 to 102-N occur, time durations associated with individual vapings using the given cartridge 102-1 to 102-N, etc. The control device 118 may update usage history information 356 stored in a given account 350-1 to 350-N based on accessing usage history information from the one or more various electronic storage devices 105 of cartridges 102-1 to 102-N. In some example embodiments, control device 118 may update one or more instances of usage history information 356 stored in one or more accounts 350-1 to 350-N based on accessing usage history information from an electronic storage device 119 of the power supply section 106.

In some example embodiments, the control device 118 generates a new cartridge account 350 based on determining that identification information associated with a given cartridge 102, accessed from an electronic storage device of the given cartridge 102, does not correspond to identification information associated with any existing accounts 350. The new account may include the identification information associated with a given cartridge 102, and the control device 118 may populate the account with cartridge status information 354 and usage history information 356 accordingly.

In some example embodiments, the control device 118 is configured to delete one or more accounts 350-1 to 350-N. The control device 118 may delete an account 250 based on receiving a delete command from remotely-located computer device 220 via a communication link 210. The control device 118 may delete an account 350 based on a quantity of accounts 350-1 to 350-N stored at the PCC 100 exceeding a first threshold quantity. The control device 118 may selectively delete a quantity of accounts 350 such that the quantity of remaining accounts 350 is reduced to at least a second threshold quantity that may be the same or different than the first threshold quantity. When the control device 118 deletes an account 350 based on a quantity of accounts 350-1 to 350-N stored at the PCC 100 exceeding a first threshold quantity, the control device 118 may selectively delete accounts 350-1 to 350-N in order of descending age such that an oldest account 350 is deleted first. The control device 350 may delete a given account 350 in response to a period of time elapsed since a most recent update of the given account 350 exceeding a time threshold value. The control device may delete an account 350 based on adult vaper 230 interaction with one or more interfaces of the PCC 100.

Figure 4:
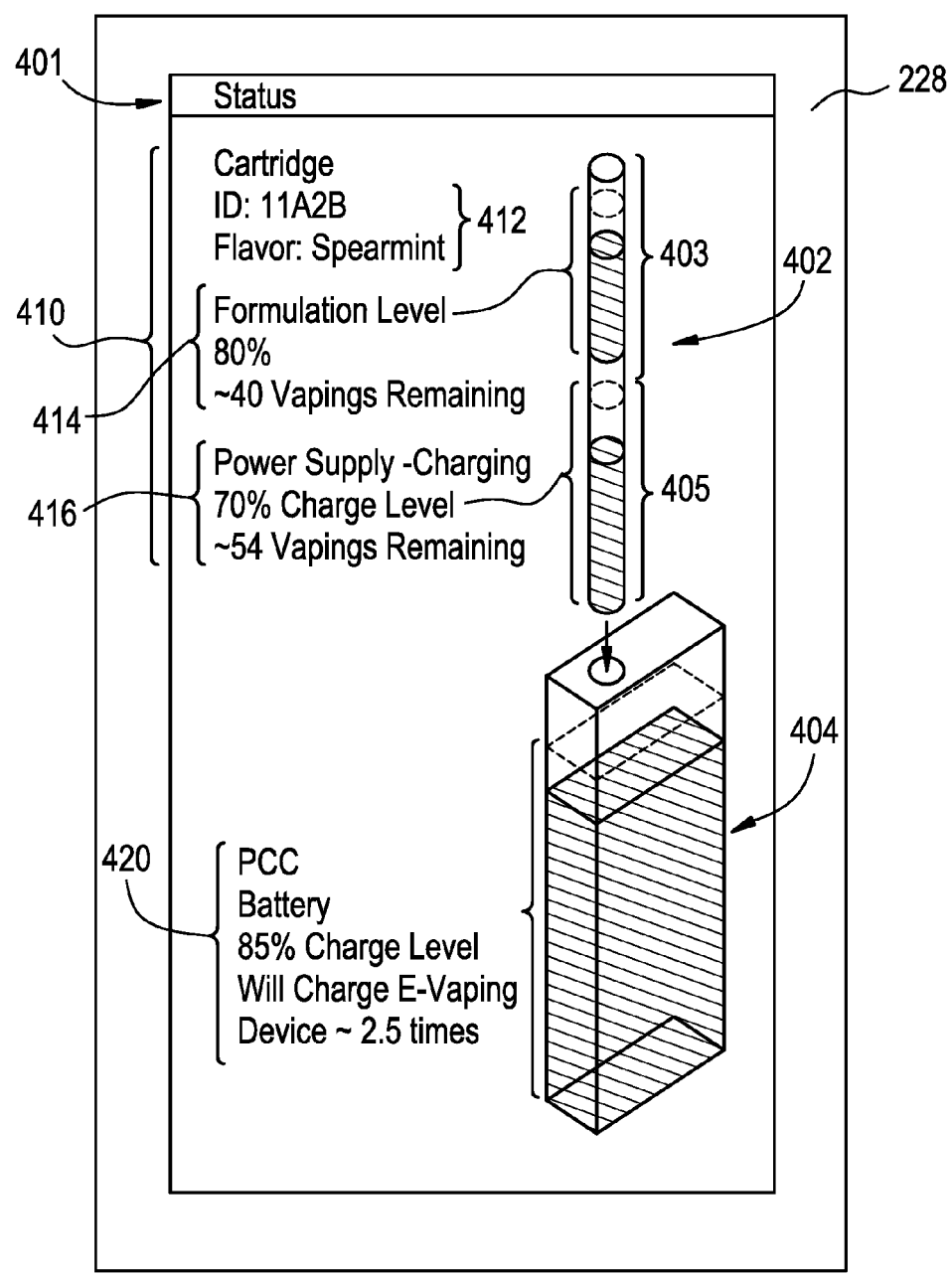
FIG. 4 illustrates a status information display interface generated by a remotely-located computer device, according to some example embodiments.

FIG. 4 illustrates a status information display interface generated by the remotely-located computer device 220 of FIG. 2, according to some example embodiments.

In some example embodiments, a computer device display 228 of computer device 220 displays a EVD status interface 401, where the EVD status interface 401 provides status information indicating a status of one or more portions of an EVD 101 coupled to a PCC 100, a status of one or more portions of the PCC 100, or some combination thereof. The PCC 100 to which the EVD is coupled may be communicatively coupled to the computer device 220 via a communication link 210. The interface 401 may provide information received from a control device 118 of the PCC 100 via a communication link.

As shown in FIG. 4, the EVD status interface 401 may include graphical representations of one or more portions of the EVD 101 and the PCC 100 to which the computer device 220 is communicatively coupled. For example, the EVD status interface 401 includes a graphical representation 404 of the PCC 100 and a graphical representation 402 of the EVD 101.

As shown, the graphical representation 404 of the PCC 100 includes a graphical representation of a charge level of a PCC battery 117 of the PCC 100, thereby providing an adult vaper with a visually observable indication regarding a charge level of the PCC battery 117. In addition, the EVD status interface 401 may provide PCC status information 420 that indicates a status of the PCC battery 117. A PCC battery status may include a charge level of the PCC battery 117. The information 420, as shown, may indicate the charge level of the PCC battery 117 as a proportion of a full charge.

In some example embodiments, including the embodiment shown in FIG. 4, the information 420 may indicate the charge level of the PCC battery 117 as a quantity of times that the PCC battery 117 can fully charge an EVD power supply 107 of the EVD 101 before the PCC battery 117 is fully discharged, is discharged below a threshold charge level, or some combination thereof. For example, the information 420 may indicate a quantity of times the that PCC battery 117 can fully charge an EVD power supply 107 of the EVD 101 before the amount of electrical power stored in the PCC battery 117 is not greater than an amount of electrical power stored in the EVD power supply 107.

The graphical representation 402 of the EVD 101 includes a graphical representation 403 of a cartridge 102 of the EVD 101 and a graphical representation 405 of the power supply section 106 of the EVD 101. The graphical representation 403 of the cartridge section 102 includes a graphical representation of an amount of formulation in a reservoir of a dispersion generator 103 of the cartridge (i.e., "reservoir level"), thereby providing an adult vaper with a visually observable indication regarding the reservoir level. The graphical representation 405 of the power supply section 106 includes a graphical representation of a charge level of an EVD power supply 107 in the power supply section 106, thereby providing an adult vaper with a visually observable indication regarding a charge level of the EVD power supply 107.

The EVD status interface 401 may provide status information 410 associated with the EVD 101. The information 410, as shown, may include cartridge identification information 412, cartridge status information 414 indicating one or more cartridge statuses, and EVD power supply status information 416 indicating one or more EVD power supply statuses.

In some example embodiments, including the embodiment shown in FIG. 4, the cartridge identification information 412 may include information that uniquely identifies the cartridge 102, a formulation included in the cartridge 102, or some combination thereof.

In some example embodiments, including the embodiment shown in FIG. 4, the cartridge statuses indicated by cartridge status information 414 may include a reservoir level of the cartridge 102, where the reservoir level is indicated as a proportion of the amount of formulation held in a completely filled reservoir. The reservoir level may be indicated as a quantity of times that the present amount of formulation held in the reservoir may be used to generate a dispersion (i.e., how many vapings the cartridge 102 may support before sufficiently exhausting the formulation held in the reservoir to prevent the cartridge 102 from supporting additional vapings).

In some example embodiments, including the embodiment shown in FIG. 4, the EVD power supply statuses indicated by EVD power supply status information 416 may include a charge level of the EVD power supply 107, where the charge level of the EVD power supply 107 is indicated as a proportion of the amount of electrical power held in a completely charged EVD power supply 107. The EVD power supply charge level may be indicated as a quantity of times that the EVD 101 may generate a dispersion to support vaping given the present charge level of the EVD power supply 107 (i.e., how many vapings the EVD power supply 107 may support before sufficiently exhausting the electrical power stored in the EVD power supply 107 to prevent the EVD 101 from supporting additional vapings).

Figure 5:
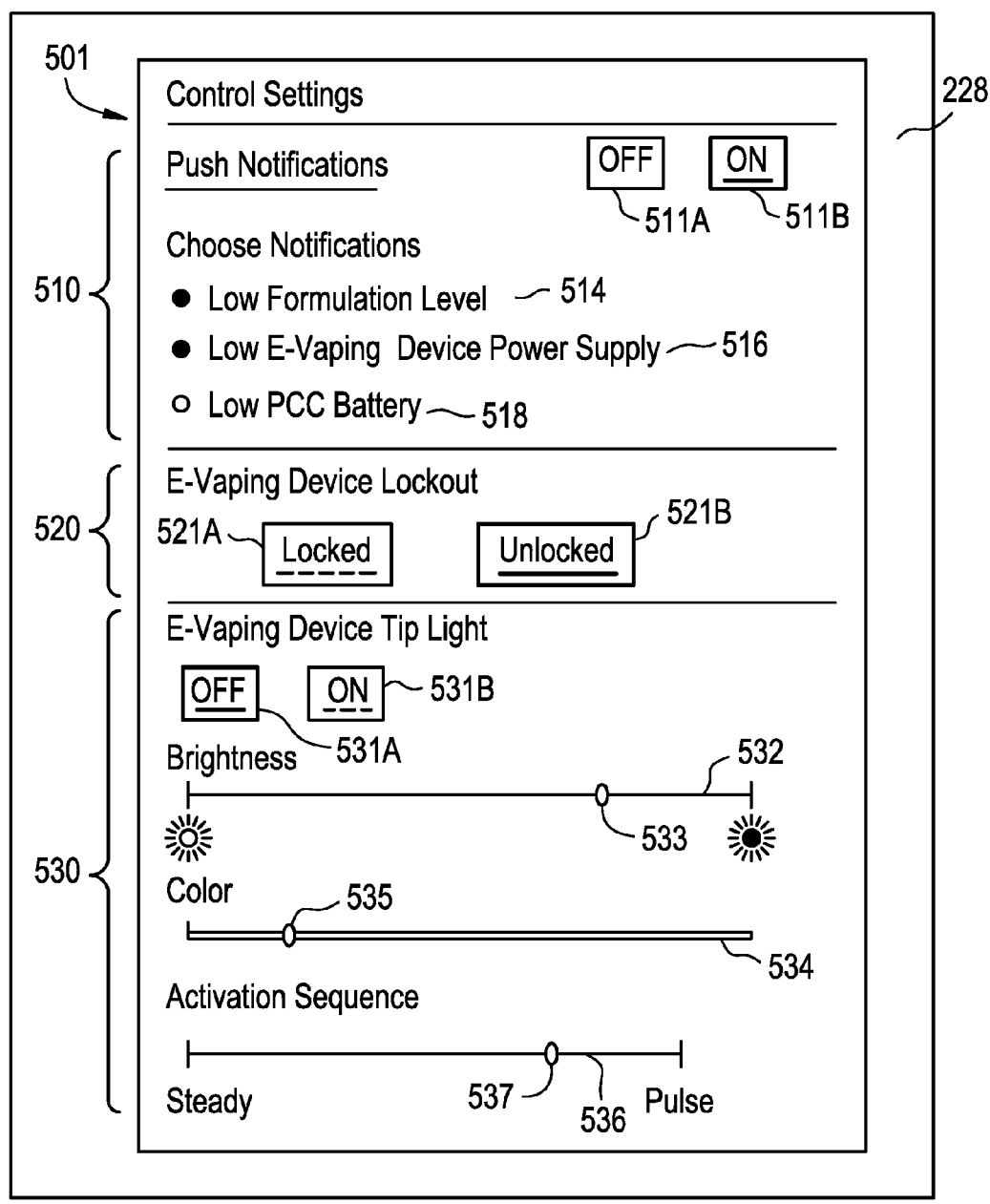
FIG. 5 illustrates a control settings display interface generated by a remotely-located computer device, according to some example embodiments.

FIG. 5 illustrates a control settings display interface generated by the remotely-located computer device 220 of FIG. 2, according to some example embodiments.

In some example embodiments, a computer device display 228 of computer device 220 displays a control setting interface 501, where the control setting interface 501 provides information indicating various control settings via which the PCC control device 118 may control one or more elements of the EVD 101, may communicate information associated with one or more of the EVD 101 or the PCC 100 to the computer device 220, and/or the like. The control setting interface 501 may include interactive icons via which an adult vaper 230 may interact to specify one or more control settings. The control setting interface 501 may include interactive icons that provide one or more graphical representations of one or more control settings. The computer device 220 in which the display 228 is included may generate one or more control commands according to one or more adult-vaper specified control settings. The one or more control commands may be communicated to a control device 118 of the PCC 100 via a communication link 210 between the control device 118 and the computer device 220. Thus, the control commands may be adult-vaper 230 initiated based on interaction between the adult vaper 230 and an interface 226 of the computer device 220.

The control settings interface 501 includes a set of push notification settings 510. The push notification settings 510 include a set of activation icons 511A-B. An adult vaper 230 may interact with one or more of the icons 511A-B to selectively enable or disable push notifications. In addition, the push notification settings 510 include a set of icons 514, 516, 518, where each icon is associated with a separate push notification that an adult vaper 230 may selectively enable. Each push notification is associated with at least one threshold level of at least one EVD status or PCC status. When a given notification is enabled, the computer device 220 on which the display 228 is included may generate a control command specifying the given notification and commanding the control device 118 of the PCC 100 to selectively push the notification to the computer device 220 if a given associated EVD status or PCC status at least meets the threshold associated with the notification.

As shown in FIG. 5, the push notification icons may include an icon 514 associated with an EVD reservoir level notification. The EVD reservoir level notification may be a push notification that is generated when reservoir level of a reservoir in an EVD 101 coupled to the PCC 100 at least meets a threshold reservoir level.

The push notification icons may include an icon 516 associated with an EVD power supply charge level notification. The EVD power supply charge level notification may be a push notification that is generated when a charge level of an EVD power supply 107 in an EVD 101 coupled to the PCC 100 at least meets a threshold charge level.

The push notification icons may include an icon 518 associated with a PCC battery charge level notification. The PCC battery charge level notification may be a push notification that is generated when a charge level of a PCC battery 117 in the PCC 100 at least meets a threshold charge level.

As shown, the icons 514 and 516 indicate that the EVD reservoir level notification and the EVD power supply charge level notification are enabled. Icon 518 indicates that the PCC battery charge level notification is disabled. An adult vaper 230 may selectively enable or disable separate notifications via interaction with one or more icons 514, 516, 518. An adult vaper 230 may enable or disable all of the notifications, as shown by icons 511A-B via interaction with one or more interfaces 226 of the computer device 220. In some embodiments, display 228 is a touch-sensitive display interface and icons 511A-B, 514, 516, 518 are interactive icons via which an adult vaper 230 may interact to enable or disable one or more notifications.

In some example embodiments, the respective notifications indicated by icons 514, 516, 518 may be associated with separate notification messages. When a given notification is enabled, the computer device 220 in which the display 228 is included may generate one or more control commands and communicate the one or more control commands to a control device 118 of a PCC 100. The control command may include an indication that a given notification is selectively enabled or disabled, an indication of a threshold value associated with the given notification, an indication of a notification message associated with the given notification, or some combination thereof.

When the control command indicates that a given notification is disabled, the control device 118 may refrain from communicating the notification when a determined EVD status, PCC status, etc. at least meets the threshold value associated with the notification. When the control command indicates that a given notification is enabled, the control device 118 may communicate the given notification to the computer device 220 when a determined EVD status, PCC status, etc. at least meets the threshold value associated with the given notification. The communicated notification may indicate that the determined EVD status, PCC status, etc. at least meets the threshold value associated with the notification. The communicated notification may include the notification message associated with the notification.

The control settings interface 501 includes a lockout interface 520 indicating, via icons 521A-B, whether an EVD 101 coupled to a PCC 100 is disabled, such that the EVD 101 is disabled from supporting vaping (i.e., disabled from forming dispersions). An adult vaper 230 may selectively enable or disable the EVD 101, as shown by icons 521A-B via interaction with one or more interfaces 226 of the computer device 220. In some embodiments, display 228 is a touch-sensitive display interface and icons 521A-B are interactive icons via which an adult vaper 230 may interact to enable or disable the EVD 101.

Based on the adult vaper 230 interacting with the computer device 220 to enable or disable the EVD 101, the computer device 220 may generate a control command. The control command may include a command to enable or disable the EVD 101 according to the adult vaper 230 interaction with the computer device 220. The control command may be communicated to a control device 118 of the PCC 100 via a communication link 210 between the computer device 220 and the control device 118. Upon receiving the control command, the control device 118 may control one or more elements of an EVD 101 to which the control device 118 is communicatively coupled to selectively enable or disable the EVD 101 according to the control command.

The control settings interface 501 includes an activation light interface 530 indicating, via icons 531A-B, whether an activation light 111 of an EVD 101 coupled to the linked PCC 100 is configured to emit light when the EVD 101 generates a dispersion. The activation light interface 530 further indicates, via icons 532, 533, 534, 535, 536, 537 various operating parameters according to which the activation light 111 of the EVD 101 is controlled during vaping. An adult vaper 230 may selectively enable or disable the EVD activation light 111, as shown by icons 531A-B, control one or more operating parameters of the EVD activation light 111, as shown by icons 532-537, or some combination thereof, via interaction with one or more interfaces 226 of the computer device 220. In some embodiments, display 228 is a touch-sensitive display interface and one or more of icons 531A-B, 532-537 are interactive icons via which an adult vaper 230 may interact to control the EVD activation light 111.

An adult vaper 230 may interact with one or more interfaces 226 of the computer device 220 to adjust an operating parameter that includes selectively enabling or disabling the EVD activation light 111, as indicated by icons 531A-B.

An adult vaper 230 may interact with one or more interfaces 226 to adjust an operating parameter that includes a brightness of light emitted by the EVD activation light 111 during vaping, as shown by icons 532-533. The illustrated icons 532-533 include a sliding scale 532 along which an icon 533 is positioned to indicate a relative brightness of light emitted by the EVD activation light 111 during vaping.

An adult vaper 230 may interact with one or more interfaces 226 to adjust an operating parameter that includes a color temperature of light emitted by the EVD activation light 111 during vaping, as shown by icons 534-535. The illustrated icons 534-535 include a sliding scale 534 along which an icon 535 is positioned to indicate a relative color temperature of light emitted by the EVD activation light 111 during vaping.

An adult vaper 230 may interact with one or more interfaces 226 to adjust an operating parameter that includes an activation sequence according to which light is emitted by the EVD activation light 111 during vaping, as shown by icons 536-537. The illustrated icons 536-537 include a sliding scale 536 along which an icon 537 is positioned to indicate a relative frequency of pulsing of the emitted light by the EVD activation light 111 during vaping.

Based on the adult vaper 230 interacting with the computer device 220 to control the EVD activation light 111 as indicated by one or more of icons 531-537, the computer device 220 may generate one or more control commands. The control commands may include a command to enable or disable the EVD activation light 111, adjust one or more operating parameters of the EVD activation light 111, etc. according to the adult vaper 230 interaction with the computer device 220. The control command may be communicated to a control device 118 of the PCC 100 via a communication link 210 between the computer device 220 and the control device 118. Upon receiving the control command, the control device 118 may control one or more elements of an EVD 101 to which the control device 118 is communicatively coupled to control the EVD activation light 111 according to the control command.

Figure 6A:
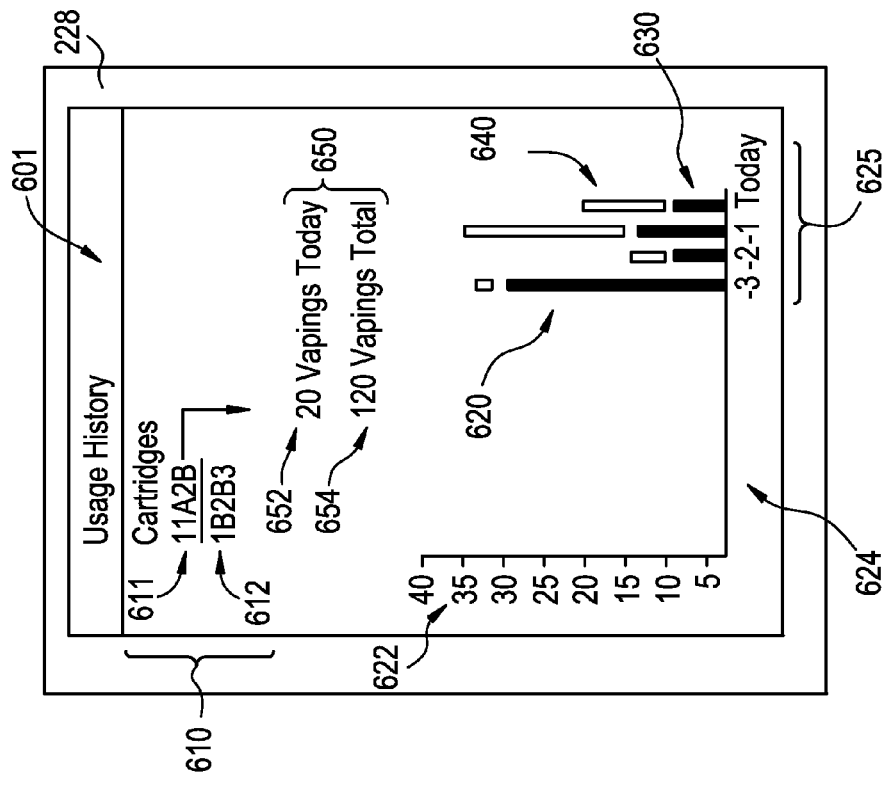
FIG. 6A illustrates an EVD usage display interface generated by a remotely-located computer device, according to some example embodiments.
Figure 6B:
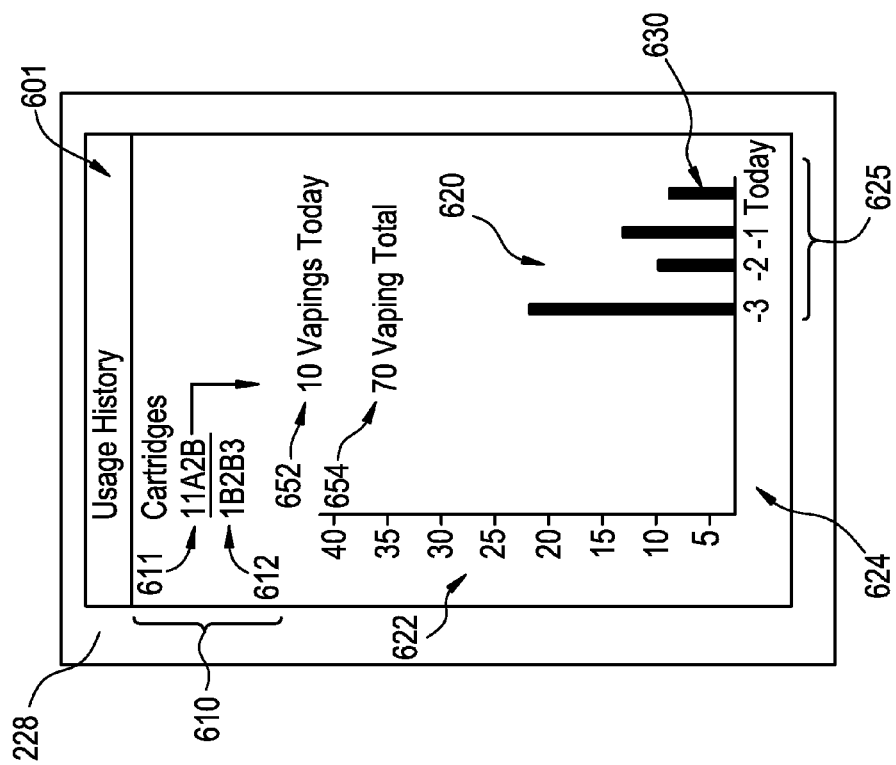
FIG. 6B illustrates an EVD usage display interface generated by a remotely-located computer device, according to some example embodiments.

FIG. 6A illustrates an EVD usage display interface generated by the remotely-located computer device 220 of FIG. 2, according to some example embodiments. FIG. 6B illustrates an EVD usage display interface generated by the remotely-located computer device 220 of FIG. 2, according to some example embodiments.

In some example embodiments, a computer device display 228 displays a usage history interface 601, where the usage history interface 601 provides information indicating a history of usage of one or more cartridges to support vaping by an EVD coupled to a PCC, where the PCC is linked to a computer device in which the computer device display interface 228 is included.

Usage history information may be generated based on monitoring one or more instances of cartridge status information, EVD power supply status information, status information, etc. over time. For example, usage history information including a historical record of vapings supported by a given EVD 101 may be based on a historical record of reservoir levels of a cartridge 102 of the EVD 101, a historical record of EVD power supply charge levels of an EVD power supply 107 of the EVD 101, a historical record of triggering of a sensor included in an EVD 101, some combination thereof, etc. A sensor included in an EVD 101 may be at least one of a pressure sensor, a MEMS sensor, etc. The sensor may generate a signal based upon being triggered, and control circuitry 108 of the EVD 101 may activate dispersion generation by a dispersion generator 103 in the EVD 101 based upon detecting the generated signal. The usage history information may be generated at one or more of a control device 118 included in a PCC 100 to which the EVD 101 may be docked, a computer device 220 communicatively linked to the PCC 100, or some combination thereof. Usage history information generated at the control device 118 may be communicated to the computer device 220 via a communication link 210.

In some example embodiments, usage history information may be associated with a particular cartridge 102, based on the particular cartridge 102 being coupled to the EVD 101 when EVD statuses, PCC statuses, etc. are determined. For example, separate instances of determined EVD power supply charge levels may be associated with separate cartridges 102 based on which cartridge 102 is concurrently coupled to the EVD power supply 107. Associating usage history information with a cartridge 102 may include associating the usage history information with a cartridge account associated with the cartridge 102. In some example embodiments, usage history information may be selectively displayed based on association of the usage history information with one or more particular cartridge accounts. Thus, usage of different cartridges 102 may be more accurately tracked.

In some example embodiments, the usage history interface 601 provides cartridge identification information 610 that identifies various cartridges 102 that have been used with the coupled EVD 101 to support vaping. As shown, the information 610 may include unique identifiers 611, 612 associated with separate cartridges 102. As further shown, a given identifier may be highlighted to show that the usage history information 620, 650 displayed on the interface 601 includes usage history information associated with the given identifier.

FIG. 6A shows a usage history interface 601 where identifier 611 is highlighted and identifier 612 is not highlighted. Thus, the information 610 indicates that the usage history information 620, 650 includes usage history information associated with a cartridge 102 associated with identifier 611 and excludes usage history information associated with a cartridge associated with identifier 612.

FIG. 6B shows a usage history interface 601 where both identifier 611 and identifier 612 are highlighted. Thus, the information 610 indicates that the usage history information 620, 650 includes both usage history information associated with the cartridge 102 associated with identifier 611 and usage history information associated with a cartridge 102 associated with identifier 612.

Usage history interface 601 includes a graphical representation 620 of usage history information indicating usage of one or more cartridges 102 to support vaping over time. The graph 620 shows a quantity 622 of vapings for each of a set of time periods 624. In the illustrated embodiments shown in FIGS. 6A and 6B, the graph 620 shows a quantity 622 of vapings for each separate day of a set 625 of days prior to and including a present day.

The illustrated graph 620 is a bar graph, but it will be understood that the graph 620 can be any type of graph illustrating vapings over one or more periods of time, including a line graph, pie chart, etc.

As shown in FIGS. 6A and 6B, the graph 620 shows a quantity of vapings supported by each cartridge 102 indicated by a highlighted unique indicator 611-612. For example, in FIG. 6A, where unique indicator 611 is highlighted and unique indicator 612 is not highlighted, the graph 620 includes a set 630 of bars indicating a quantity of vapings supported by the cartridge associated with unique indicator 611. In another example, in FIG. 6A, where unique indicators 611 and 612 are both highlighted, the graph 620 includes a set 630 of bars indicating a quantity of vapings supported by the cartridge 102 associated with unique indicator 611 and another set 640 of bars indicating a quantity of vapings supported by the cartridge 102 associated with unique identifier 612. As shown in FIG. 6B, the separate sets 630, 640 of bars may be arranged on graph 620 to indicate a total number of vapings collectively supported by the cartridges 102 associated with all of the highlighted unique indicators 611-612.

Usage history interface 601 includes a textual representation 650 of usage history information indicating usage of one or more cartridges 102 to support vaping over time. The information 650 includes information 652 and information 654. Information 652 indicates a particular number of vapings supported by one or more cartridges 102 associated with the highlighted unique indicators 611-612 during a particular time period, including the present time period (e.g., "today"). Information 654 indicates a particular number of vapings supported by one or more cartridges 102 associated with the highlighted unique indicators 611-612 during another time period that may include a collection of multiple time periods. The collection of multiple time periods may include the present time period. The collection of multiple time periods may include all time periods, such that information 654 indicates a total number of vapings supported by one or more cartridges 102 associated with the highlighted unique indicators 611-612 (e.g., "today").

Figure 7:
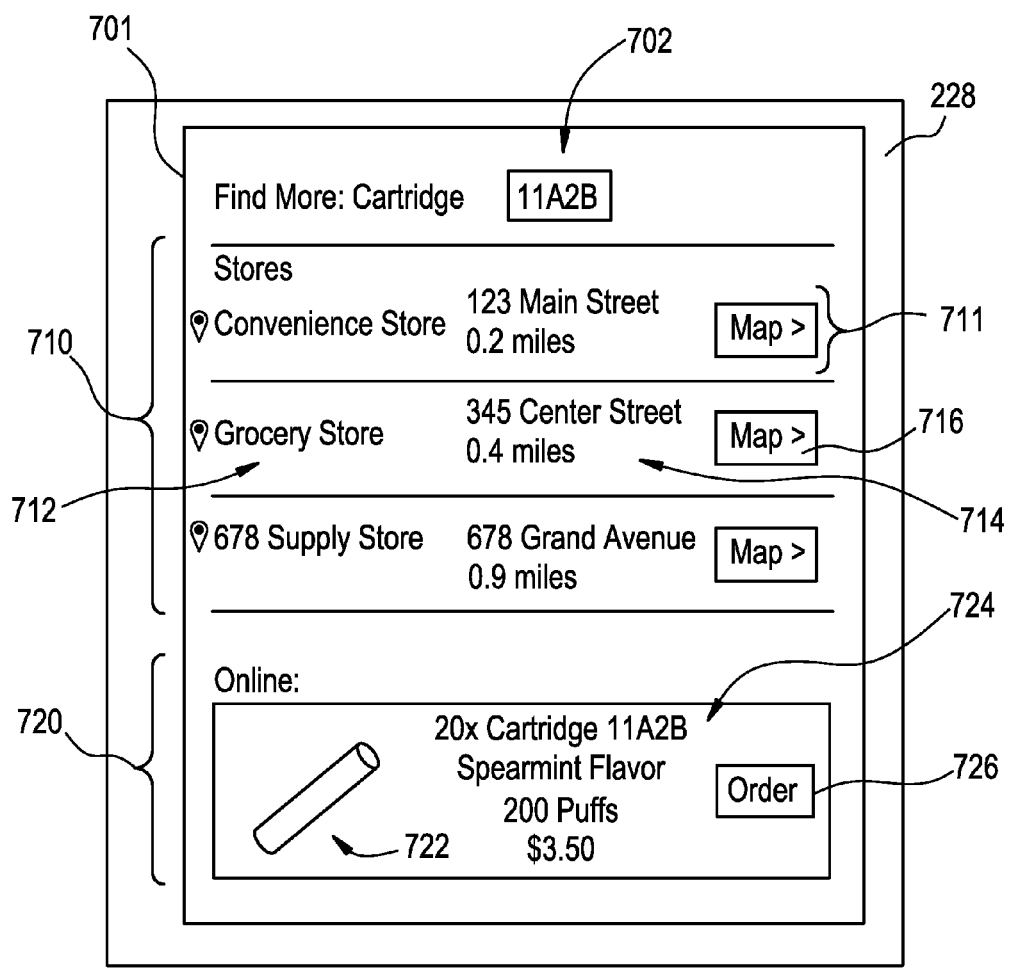
FIG. 7 illustrates a shopping display interface generated by a remotely-located computer device, according to some example embodiments.

FIG. 7 illustrates a shopping display interface generated by the remotely-located computer device 220 of FIG. 2, according to some example embodiments.

In some example embodiments, a computer device display 228 displays a shopping interface 701, where the usage history interface 501 provides information indicating a history of usage of one or more cartridges 102 to support vaping by an EVD 101 coupled to a PCC 100, where the PCC 100 is linked to a computer device 220 in which the computer device display interface 228 is included.

In some example embodiments, an adult vaper 230 interacting with a computer device 220 may be provided with an interface 226 that facilitates purchase of cartridges 102, where the cartridges 102 to be purchased are similar to a cartridge 102 of an EVD 101 coupled to a PCC 100 to which the computer device 220 is communicatively linked. The cartridge 102 may be identified based on identification information associated with the cartridge 102. A control device 118 of the PCC 100 may access the identification information from one or more portions of the EVD 101, including an electronic storage device 105 included in the cartridge 102. The control device 118 may communicate the identification information to the computer device 220. The control device 118 may further communicate EVD status information associated with the cartridge 102, including reservoir level.

Based on information associated with the cartridge 102 that is received from the control device 118, the computer device 220 may provide a shopping interface 701 configured to present purchase options associated with cartridges that correspond to the cartridge 102. The purchase options may be provided to an adult vaper 230 via a display interface 228. The purchase options may provide proximate locations at which the corresponding cartridges 102 may be available for purchase, an interface via which an adult vaper 230 may order one or more corresponding cartridges 102, or some combination thereof. As a result, an adult vaper 230 may be provided with an ability to purchase similar cartridges to a cartridge 102 that is presently linked to a PCC 100.

As shown, the shopping interface 701 includes a target cartridge indicator 702. The indicator 702 indicates a particular cartridge 102 to which the additional information 710, 720 presented by the interface 701 is associated. The indicator 702 shows a unique identifier associated with the particular cartridge 102. The unique identifier may be selected from a list of unique identifiers, entered manually, etc. In some example embodiments, the target cartridge indicator 702 includes one or more instances of identification information associated with a cartridge 102, including information identifying a flavorant and/or flavor of a formulation held in a cartridge 102. The identification information may be received from a PCC 100 communicatively linked to the computer device 220.

As shown, the shopping interface 701 includes a representation 710 of a set of store entries 711 arranged by increasing distance from a present geographical location of the computer device 220. Each entry 711 includes an identification 712 of a store at which one or more EVD devices associated with the identifier 702 may be available for purchase. Each entry 711 also includes an indication 714 of a physical address and proximity of the identified store and an interactive map icon 716 via which an adult vaper 230 may interact to access a map display of the geographic location of at least the identified store.

The displayed store entries 711 may be selected from a list of entries. Each store entry may each be associated with a list of cartridges 102 available for purchase at the store indicated by the entry. The list of cartridges 102 may identify the available cartridges 102 by unique identifier. The unique identifiers according to which cartridges 102 are identified as available for purchase may correspond to an identifier 702 via which a particular cartridge 102 may be specified. Entries may be selected based on one or more of correlating the identifier 702 with identifiers of available cartridges 102 associated with entries 711, physical locations and proximities associated with entries 711, or some combination thereof.

As shown, the shopping interface 701 may include an online purchasing portal 720. The portal may present a representation 722 of a cartridge 102 corresponding to the identifier 702, information 724 associated with the corresponding cartridge 102, and an interactive icon 726 via which an adult vaper 230 may interact to purchase the corresponding cartridge 102. The computer device 220 in which display 228 is included may be communicatively linked to a purchasing service via a communication network, and the portal 720 may be displayed based on interaction between the computer device and the purchasing service. The purchasing service may be implemented on one or more computer systems located remotely from the computer device 220 and communicatively coupled to the computer device 220 via one or more communication networks.

Figure 8:
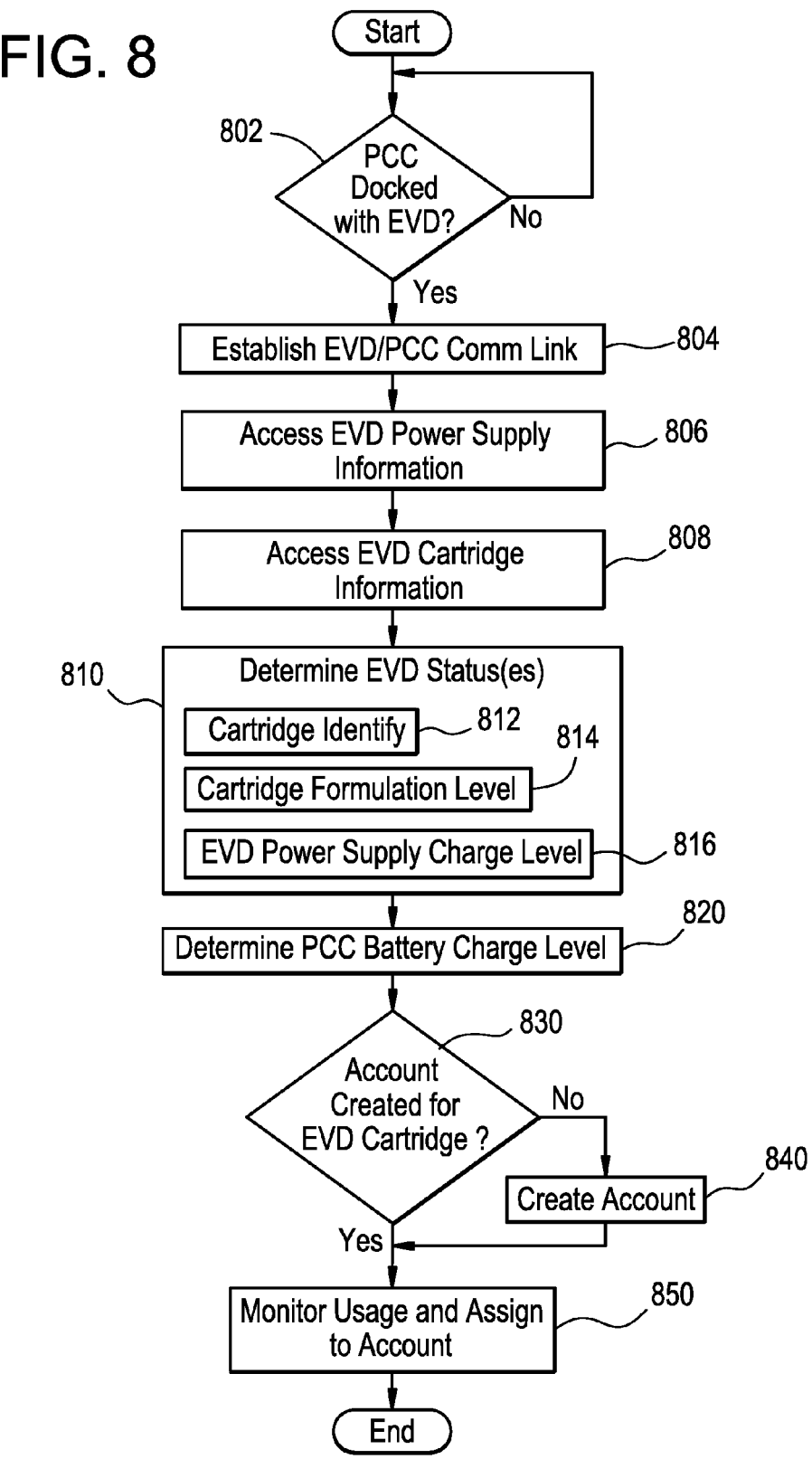
FIG. 8 is a flowchart illustrating a method for interacting with an EVD and a remotely-located computer device, according to some example embodiments.

FIG. 8 is a flowchart illustrating a method for interacting with an EVD and a remotely-located computer device, according to some example embodiments. The interacting may be implemented via a control device. The control device implementing the communicating may include the control device 118 of PCC 100, illustrated and described above with reference to at least FIG. 1 and FIG. 2.

Referring to FIG. 8, at 802, the control device determines whether a PCC is coupled with an EVD. If so, at 804, the control device commands an interface to establish a communication link between the PCC and the EVD. The determining may be based on the control device receiving information from the EVD via an interface. The communication link may include a direct connection between one or more portions of the PCC and one or more portions of the EVD. In some example embodiments, the communication link is a wireless network communication link.

At 806, the control device accesses EVD power supply section information via communication with one or more portions of the EVD. The control device may access information stored at control circuitry 108, query information from control circuitry 108, generate information based on monitoring one or more portions of the power supply section of the EVD, some combination thereof, etc. For example, the control device may generate EVD power supply charge level information based on monitoring the EVD power supply via the communication link.

At 808, the control device accesses cartridge information via communication with one or more portions of the EVD. The control device may access information stored at control circuitry in the EVD, access information stored at an electronic storage device in the cartridge of the EVD, generate information based on monitoring one or more portions of the cartridge, some combination thereof, etc. For example, the control device may access cartridge identification information based on accessing data from an electronic storage device in the cartridge.

At 810, the control device determines a status of one or more portions of the EVD and generates EVD status information indicating said determined statuses. The control device determines an EVD status based on one or more of the cartridge information or power supply section information.

The determining at 810 may include determining 812 an identity of the cartridge based on cartridge information accessed from the EVD. Determining an identity of the cartridge may include determining one or more unique identifiers of the cartridge, determining one or more properties of a formulation held in the cartridge, and some combination thereof.

The determining at 810 may include determining 814 a formulation reservoir level of one or more dispersion generators of the cartridge based on cartridge information accessed from the EVD. The reservoir level may include information indicating one or more of an amount of formulation held in a reservoir of the cartridge, a proportion of formulation held in the reservoir of the cartridge, relative to an amount of the formulation held in a completely filled reservoir of the cartridge, a quantity of vapings that may be provided via generation of a dispersion using the formulation held in the reservoir of the cartridge, and some combinations thereof.

The determining at 810 may include determining 816 a charge level of an EVD power supply included in a power supply section of the EVD. The EVD power supply charge level may include information indicating one or more of an amount of electrical power stored in the EVD power supply, a proportion of electrical power held in the EVD power supply, relative to an amount of electrical power held in a completely charged EVD power supply, a quantity of vapings that may be provided completely discharging the EVD power supply, and some combinations thereof.

At 820, the control device determines a charge level of a PCC battery included in the PCC. The charge level may include information indicating one or more of an amount of electrical power stored in the PCC battery, a proportion of electrical power held in the PCC battery, relative to an amount of electrical power held in a completely charged PCC battery, a quantity of vapings that may be provided completely discharging the PCC battery, a quantity of times the internal battery of the PCC may fully charge the EVD, and some combinations thereof.

At 830, the control device determines whether the cartridge of the coupled EVD is associated with an existing cartridge account. The cartridge account may be stored locally at the control device or at an electronic storage device communicatively coupled to the control device. The cartridge account may include identification information that uniquely identifies an EVD cartridge associated with the account. The determination at 830 may include comparing cartridge identification information determined at 812 with identification information included in one or more cartridge accounts. If, at 840, the cartridge identification information determined at 812 is determined to not correlate with identification information included in any of the cartridge accounts, the control device creates a new cartridge account and associates the determined cartridge identification information with the new account, thereby creating a cartridge account associated with the cartridge of the coupled EVD.

At 850 the control device associates the cartridge information accessed at 808 and EVD status information determined at 810 with the cartridge account to monitor usage of the cartridge associated with the EVD device. Such monitoring may include monitoring a number of vapings per unit of elapsed time of the cartridge, a rate of usage of the cartridge, usage of cartridges with similar parameters as the cartridge (e.g., common flavorants), etc.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A personal carrying case (PCC) for holding an e-vaping device (EVD), the PCC comprising:
   a first communication interface configured to establish a first communication link with the EVD;
   a second communication interface configured to establish a second communication link with a remotely-located computer device; and
   a control device configured to control at least one element of the EVD according to a control command received from the computer device, the control command being received via the second communication link, the control device controlling the at least one element of the EVD via the first communication link,
   wherein the EVD includes one cartridge of a plurality of separate cartridges and a power supply section, the one cartridge removably connected to the power supply section, each cartridge of the plurality of separate cartridges being configured to generate a dispersion based on receiving electrical power, the power supply section including an EVD power supply and control circuitry, the EVD power supply being configured to supply electrical power to the one cartridge, the EVD control circuitry being configured to selectively control the supply of electrical power from the EVD power supply to the one cartridge,
   wherein the control device is configured to receive EVD information from the EVD via the first communication link, each instance of EVD information including an instance of cartridge information associated with the one cartridge of the plurality of separate cartridges removably connected to the power supply section of the EVD,
   wherein the control device is further configured to
      associate separate, respective cartridges of the plurality of separate cartridges with separate, respective cartridge accounts based on separate, respective instances of cartridge information received from the EVD over time via the first communication link, the separate, respective instances of cartridge information associated with the separate, respective cartridges connected to the power supply of the EVD over time,
      generate a plurality of instances of EVD usage history information based on monitoring instances of EVD information received from the EVD over time, each instance of EVD usage history information being associated with usage of the EVD to generate a dispersion during vaping, and
      associate separate, respective instances of EVD usage history information with separate, respective cartridge accounts based on correlating each instance of cartridge information included in each monitored instance of EVD information with a particular cartridge of the plurality of separate cartridges, the particular cartridge associated with a particular cartridge account of the separate, respective cartridge accounts.

2. The PCC of claim 1, wherein
   the second communication link is an ad hoc wireless network communication link; and
   the control device is configured to command the second communication interface to establish the second communication link based on the first communication interface establishing the first communication link with the EVD.

3. The PCC of claim 1, wherein the control device is configured to control the at least one element to selectively disable the EVD from generating the dispersion.

4. The PCC of claim 1, wherein the control device is configured to control the at least one element to selectively adjust at least one parameter of light emitted by an activation light of the EVD during vaping.

5. The PCC of claim 1, wherein
   the EVD information includes information associated with at least one element of the EVD;
   the control device is further configured to determine a status associated with the EVD based on the information; and
   the control device is further configured to communicate the status to the remotely-located computer device via the second communication link.

6. The PCC of claim 1, wherein the cartridge information includes at least one of:
   identification information identifying the cartridge;
   flavorant information indicating a flavor of formulation, the formulation being held in a reservoir of the cartridge; and
   formulation reservoir level information indicating an amount of a formulation held in the reservoir of the cartridge.

7. The PCC of claim 1, wherein the control device is configured to receive the cartridge information from a cartridge storage device via the first communication link, the cartridge storage device being included in the cartridge.

8. The PCC of claim 1, wherein
   the EVD information includes EVD power supply information indicating a charge level of the EVD power supply; and
   the control device is configured to receive the EVD power supply information from the power supply section via the first communication link.

9. The PCC of claim 5, wherein the control device is configured to generate a notification based on the EVD information, the notification indicating that at least one operating parameter of the EVD at least meets an alert threshold value.

10. A method, comprising:
    establishing a first communication link with an e-vaping device (EVD) held in a personal carrying case (PCC);
    establishing a second communication link with a remotely-located computer device; and controlling at least one element of the EVD via the first communication link according to a control command communicated from the computer device to the PCC, the control command being communicated via the second communication link, wherein the EVD includes one cartridge of a plurality of separate cartridges and a power supply section, the one cartridge removably connected to the power supply section, each cartridge of the plurality of separate cartridges being configured to generate a dispersion based on receiving electrical power, the power supply section including an EVD power supply and control circuitry, the EVD power supply being configured to supply electrical power to the one cartridge, the EVD control circuitry being configured to selectively control the supply of electrical power from the EVD power supply to the one cartridge, wherein the method further includes receiving EVD information from the EVD via the first communication link, each instance of EVD information including an instance of cartridge information associated with the one cartridge of the plurality of separate cartridges removably connected to the power supply section of the EVD, associating separate, respective cartridges of the plurality of separate cartridges with separate, respective cartridge accounts based on separate, respective instances of cartridge information received from the EVD over time via the first communication link, the separate, respective instances of cartridge information associated with the separate, respective cartridges connected to the power supply of the EVD over time, generating a plurality of instances of EVD usage history information based on monitoring instances of EVD information received from the EVD over time, each instance of EVD usage history information being associated with usage of the EVD to generate a dispersion during vaping, and associating separate, respective instances of EVD usage history information with separate, respective cartridge accounts based on correlating each instance of cartridge information included in each monitored instance of EVD information with a particular cartridge of the plurality of separate cartridges, the particular cartridge associated with a particular cartridge account of the separate, respective cartridge accounts.

11. The method of claim 10, wherein the second communication link is an ad hoc wireless network communication link.

12. The method of claim 10, wherein controlling the at least one element includes at least one of, selectively disabling the EVD from generating the dispersion;

selectively adjusting at least one parameter of light emitted by an activation light of the EVD during vaping; and selectively disabling the activation light of the EVD.

13. The method of claim 10, wherein the EVD information is associated with at least one element of the EVD;

the method includes determining a status associated with the EVD based on the EVD information; and the method further includes communicating the status to the remotely-located computer device via the second communication link.

14. A non-transitory computer readable medium storing program code, the program code, when executed by a computer processing device, causes the computer processing device to:

establish a first communication link with an e-vaping device (EVD) held in a personal carrying case (PCC);

establish a second communication link with a remotely-located computer device; and control at least one element of the EVD via the first communication link according to a control command communicated from the computer device to the PCC, the control command being communicated via the second communication link, wherein the EVD includes one cartridge of a plurality of separate cartridges and a power supply section, the one cartridge removably connected to the power supply section, each cartridge of the plurality of separate cartridges being configured to generate a dispersion based on receiving electrical power, the power supply section including an EVD power supply and control circuitry, the EVD power supply being configured to supply electrical power to the one cartridge, the EVD control circuitry being configured to selectively control the supply of electrical power from the EVD power supply to the one cartridge, wherein the program code, when executed by a computer processing device, further causes the computer processing device to receive EVD information from the EVD via the first communication link, each instance of EVD information including an instance of cartridge information associated with the one cartridge of the plurality of separate cartridges removably connected to the power supply section of the EVD, associate separate, respective cartridges of the plurality of separate cartridges with separate, respective cartridge accounts based on separate, respective instances of cartridge information received from the EVD over time via the first communication link, the separate, respective instances of cartridge information associated with the separate, respective cartridges connected to the power supply of the EVD over time, generate a plurality of instances of EVD usage history information based on monitoring instances of EVD information received from the EVD over time, each instance of EVD usage history information being associated with usage of the EVD to generate a dispersion during vaping, and associate separate, respective instances of EVD usage history information with separate, respective cartridge accounts based on correlating each instance of cartridge information included in each monitored instance of EVD information with a particular cartridge of the plurality of separate cartridges, the particular cartridge associated with a particular cartridge account of the separate, respective cartridge accounts.

15. The non-transitory computer readable medium of claim 14, wherein the second communication link is an ad hoc wireless network communication link.

16. The non-transitory computer readable medium of claim 14, wherein controlling the at least one element includes at least one of, selectively disabling the EVD from generating the dispersion;

selectively adjusting at least one parameter of light emitted by an activation light of the EVD during vaping; and selectively disabling the activation light of the EVD.

17. The non-transitory computer readable medium of claim 14, wherein:
the EVD information is associated with at least one element of the EVD; and
the program code, when executed by the computer processing device, further causes the computer processing device to
determine a status associated with the EVD based on the EVD information; and
communicate the status to the remotely-located computer device via the second communication link.

18. A method, comprising:
establishing a communication link with a control device of a remotely-located personal carrying case (PCC), the PCC being coupled with an e-vaping device (EVD), the EVD including one cartridge of a plurality of separate cartridges and a power supply section, the one cartridge removably connected to the power supply section, each cartridge of the plurality of separate cartridges being configured to generate a dispersion based on receiving electrical power, the power supply section including an EVD power supply and control circuitry, the EVD power supply being configured to supply electrical power to the one cartridge, the EVD control circuitry being configured to selectively control the supply of electrical power from the EVD power supply to the one cartridge;
receiving a plurality of instances of EVD usage history information from the PCC, the plurality of instances of EVD usage history information generated at the PCC based on instances of EVD information received at the PCC from the EVD over time, wherein
each instance of EVD information includes an instance of cartridge information associated with the one cartridge of the plurality of separate cartridges removably connected to the power supply section of the EVD,
each instance of EVD usage history information is associated with usage of the EVD to generate a dispersion during vaping,
each instance of EVD usage history information is associated with a particular cartridge of the plurality of separate cartridges based on the particular cartridge being associated with a particular cartridge account of the separate, respective cartridge accounts and each instance of cartridge information included in each monitored instance of EVD information being correlated with a particular cartridge of the plurality of separate cartridges; and
displaying a particular set of EVD usage history information based on a selection of a particular set of cartridges associated with the particular set of EVD usage history information.

19. The method of claim 18, further comprising:
receiving EVD status information associated with at least one element of the coupled EVD via the communication link; and
displaying a graphical representation of the EVD status information,
wherein
the EVD status information includes information indicating a proportion of formulation held in a reservoir of the EVD, the proportion of formulation indicating an amount of the formulation held in the reservoir relative to an amount of the formulation held in a completely filled reservoir of the EVD; and
the graphical representation of the EVD status information includes a graphical representation of the reservoir and a graphical representation of the proportion of formulation held in the reservoir.

20. The method of claim 18, further comprising:
receiving EVD status information associated with at least one element of the coupled EVD via the communication link; and
displaying a graphical representation of the EVD status information,
wherein
the EVD status information includes information indicating a charge level of an EVD power supply of the EVD; and
the graphical representation of the EVD status information includes a graphical representation of the EVD power supply and a graphical representation of the charge level of the EVD power supply.

21. The method of claim 18, further comprising:
receiving EVD status information associated with at least one element of the coupled EVD via the communication link; and
displaying a graphical representation of the EVD status information,
wherein
the EVD status information includes information indicating a remaining quantity of individual vapings that the EVD is configured to provide with present resources within the EVD; and
the graphical representation of the EVD status information includes a graphical representation of the remaining quantity of individual vapings that the EVD is configured to provide.

22. A non-transitory computer readable medium storing program code, the program code, when executed by a computer processing device, causes the computer processing device to:
establish a communication link with a control device of a remotely-located personal carrying case (PCC), the PCC being coupled with an e-vaping device (EVD), the EVD including one cartridge of a plurality of separate cartridges and a power supply section, the one cartridge removably connected to the power supply section, each cartridge of the plurality of separate cartridges being configured to generate a dispersion based on receiving electrical power, the power supply section including an EVD power supply and control circuitry, the EVD power supply being configured to supply electrical power to the one cartridge, the EVD control circuitry being configured to selectively control the supply of electrical power from the EVD power supply to the one cartridge;
receive a plurality of instances of EVD usage history information from the PCC, the plurality of instances of EVD usage history information generated at the PCC based on instances of EVD information received at the PCC from the EVD over time, each instance of EVD information including an instance of cartridge information associated with the one cartridge of the plurality of separate cartridges removably connected to the power supply section of the EVD, each instance of EVD usage history information being associated with usage of the EVD to generate a dispersion during vaping, each instance of EVD usage history information associated with a particular cartridge of the plurality of separate cartridges, based on the particular cartridge being associated with a particular cartridge account of the separate, respective cartridge accounts and each instance of cartridge information included in each monitored instance of EVD information being correlated with a particular cartridge of the plurality of separate cartridges; and display a particular set of EVD usage history information based on a selection of a particular set of cartridges associated with the particular set of EVD usage history information.

23. The non-transitory computer readable medium of claim 22, the program code, when executed by the computer processing device, further causes the computer processing device to receive EVD status information associated with at least one element of the coupled EVD via the communication link; and display a graphical representation of the EVD status information, wherein the EVD status information includes information indicating a proportion of formulation held in a reservoir of the EVD, the proportion of formulation indicating an amount of the formulation held in the reservoir relative to an amount of the formulation held in a completely filled reservoir of the EVD; and the graphical representation of the EVD status information includes a graphical representation of the reservoir and a graphical representation of the proportion of formulation held in the reservoir.

24. The non-transitory computer readable medium of claim 22, the program code, when executed by the computer processing device, further causes the computer processing device to receive EVD status information associated with at least one element of the coupled EVD via the communication link; and display a graphical representation of the EVD status information, wherein the EVD status information includes information indicating a charge level of an EVD power supply of the EVD; and the graphical representation of the EVD status information includes a graphical representation of the EVD power supply and a graphical representation of the charge level of the EVD power supply.

25. The non-transitory computer readable medium of claim 22, the program code, when executed by the computer processing device, further causes the computer processing device to receive EVD status information associated with at least one element of the coupled EVD via the communication link; and display a graphical representation of the EVD status information, wherein the EVD status information includes information indicating a remaining quantity of individual vapings that the EVD is configured to provide with present resources within the EVD; and the graphical representation of the EVD status information includes a graphical representation of the remaining quantity of individual vapings that the EVD is configured to provide.

\* \* \* \* \*